US008977686B2

(12) United States Patent
Manion et al.

(10) Patent No.: US 8,977,686 B2
(45) Date of Patent: Mar. 10, 2015

(54) DISTRIBUTED ROUTING TABLE INTERFACE

(75) Inventors: Todd R. Manion, Bellevue, WA (US); Kevin C. Ransom, Duvall, WA (US); Jeremy L. Dewey, Redmond, WA (US); Scott A. Senkeresty, Duvall, WA (US); Travis C. Luke, Woodinville, WA (US); Upshur W. Parks, Bothell, WA (US); Brian R. Lieuallen, Redmond, WA (US); Pritam De, Redmond, WA (US); Pallavi Choudhury, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 131 days.

(21) Appl. No.: 13/438,771

(22) Filed: Apr. 3, 2012

(65) Prior Publication Data

US 2012/0203835 A1    Aug. 9, 2012

Related U.S. Application Data

(62) Division of application No. 11/716,896, filed on Mar. 12, 2007, now Pat. No. 8,161,095.

(51) Int. Cl.
*G06F 15/16*    (2006.01)
*H04L 12/701*    (2013.01)
(Continued)

(52) U.S. Cl.
CPC ............... *H04L 45/00* (2013.01); *H04L 45/54* (2013.01); *H04L 45/56* (2013.01)
USPC ........... 709/204; 713/182; 713/150; 380/277; 380/286; 726/2; 726/21; 726/30

(58) Field of Classification Search
USPC ........... 709/204; 713/182, 150; 380/277, 286; 726/2, 21, 30
See application file for complete search history.

(56) References Cited

U.S. PATENT DOCUMENTS 5,941,955 A    8/1999    Wilby et al.
5,983,265 A    11/1999    Martino, II
(Continued)

FOREIGN PATENT DOCUMENTS

EP    1154601 A1    11/2001

OTHER PUBLICATIONS

International Search Report and Written Opinion in PCT/US2008/084617 dated May 26, 2009.
(Continued)

*Primary Examiner* — Kambiz Zand
*Assistant Examiner* — Sharif E Ullah
(74) *Attorney, Agent, or Firm* — Brian Haslam; Micky Minhas

(57) ABSTRACT

Application programming interface (API) for starting and accessing distributed routing table (DRT) functionality. The API facilitates bootstrapping into the DRT by one or more devices of a group of devices (a mesh) seeking to collaborate over a serverless connection, establishing a node of the DRT, where each node is an instance of an application that is participating in the mesh, and node participation by allowing the application to search for keys published by other nodes in the mesh, or by becoming part of the mesh by publishing a key. The API facilitates optimization of the routing table for quickly finding a root of a specific key in the mesh by finding the key directly in a cache or by asking a root node of the key that is in the local routing table that is closest numerically to the key being searched.

20 Claims, 12 Drawing Sheets

(51) Int. Cl.
*H04L 12/741* (2013.01)
*H04L 12/771* (2013.01)

(56) References Cited

U.S. PATENT DOCUMENTS

| | | | |
|---|---|---|---|
| 6,636,521 B1 | 10/2003 | Giulianelli | |
| 6,708,210 B2 | 3/2004 | Chang et al. | |
| 6,754,219 B1 | 6/2004 | Cain et al. | |
| 6,785,728 B1 | 8/2004 | Schneider et al. | |
| 6,850,492 B2 | 2/2005 | Chander et al. | |
| 6,957,438 B1 | 10/2005 | Travostino et al. | |
| 6,977,924 B1 | 12/2005 | Skoog | |
| 6,990,103 B1 | 1/2006 | Gollamudi | |
| 7,239,633 B1 | 7/2007 | Chiou | |
| 7,275,102 B2 | 9/2007 | Yeager et al. | |
| 7,366,113 B1 | 4/2008 | Chandra et al. | |
| 7,987,290 B2 | 7/2011 | Ransom et al. | |
| 2003/0105644 A1 | 6/2003 | Ali et al. | |
| 2004/0088431 A1 | 5/2004 | Carter | |
| 2004/0190477 A1 | 9/2004 | Olson et al. | |
| 2004/0260834 A1 | 12/2004 | Lindholm et al. | |
| 2005/0050224 A1 | 3/2005 | Palmer et al. | |
| 2005/0175009 A1 | 8/2005 | Bauer | |
| 2005/0275532 A1 | 12/2005 | Ferri et al. | |
| 2006/0253606 A1 | 11/2006 | Okuno | |
| 2006/0280192 A1* | 12/2006 | Desanti | 370/409 |
| 2007/0002869 A1 | 1/2007 | Miller | |
| 2007/0006314 A1 | 1/2007 | Costa et al. | |
| 2007/0064950 A1* | 3/2007 | Suzuki et al. | 380/270 |
| 2007/0140239 A1 | 6/2007 | Bauer et al. | |
| 2007/0143327 A1* | 6/2007 | Rivas et al. | 707/101 |
| 2007/0237089 A1* | 10/2007 | Chen et al. | 370/252 |
| 2007/0237153 A1 | 10/2007 | Slaughter et al. | |
| 2008/0040509 A1 | 2/2008 | Werb et al. | |
| 2008/0276181 A1* | 11/2008 | Moromisato et al. | 715/740 |
| 2009/0164663 A1 | 6/2009 | Ransom et al. | |

OTHER PUBLICATIONS

Seung Yi et al., "Security Aware Ad-Hoc Routing for Wireless Networks", Proceedings of ACM Symposium on Mobile Ad Hoc Networking & Computing, Aug. 2001, pp. 299-302.
Yih-Chun Hu et al., "Ariadne: A Secure On-Demand Routing Protocol for Ad Hoc Networks", MobiCom 2002, Sep. 23-26, 2002, pp. 12-23.
El-Khatib, et al., "Secure Dynamic Distributed Routing Algorithm for Ad Hoc Wireless Networks", International Workshop on Wireless Security and Privacy (WiSPr 2003), National Research Council of Canada, 2003, pp. 9.
Pourebrahimi, et al., "A Survey of Peer-to-Peer Networks", Proceedings of the 16th Annual Workshop on Circuits, Systems and Signal Processing, ProRisc 2005, Nov. 2005, pp. 8.
"Distribution of code and binaries over the Internet—Analysis of the problem and preliminary specification of the target architecture", EDOS, 2005, pp. 1-74.
Herbert, "What Happened to Pastry", ACM SIGOPS Operating Systems Review, vol. 41, Issue 2, 2007, pp. 10-16.
"Peer Name Resolution Protocol", Microsoft Corporation, Sep. 27, 2006, pp. 1-8.
U.S. Appl. No. 11/963,782, filed Dec. 21, 2007 Inventor(s) Ransom et al., entitled "Security Modes for a Distributed Routing Table".
Coffin et al., "Network Routing Application Programmer's Interface (API) and Walkthrough 8.0", Date: Mar. 6, 2001, http://www.isi.edu/people/johnh/PAPERS/Coffin01a.pdf.
Dabek et al., "Towards a Common API for Structured Peer-to-Peer Overlays", International Workshop on Peer-To-Peer Systems, http://pdos.csail.mit.edu/papers/iptps:apis/main.pdf, 2003, 11 pages.
Keller Eric, "JRoute: A Run-Time Routing API for FPGA Hardware (2000)", Parallel and Distributed Processing, 2000, pp. 874-881, Springer Berlin Heidelberg.

* cited by examiner

DISTRIBUTED ROUTING TABLE INTERFACE

CROSS-REFERENCE TO RELATED APPLICATIONS

This application is a Divisional application of pending U.S. patent application Ser. No. 11/716,896 entitled "DISTRIBUTED ROUTING TABLE INTERFACE" and filed Mar. 12, 2007, the entirety of which is incorporated by reference herein.

BACKGROUND

Technological advances in computing devices and networking facilitate access to a wide variety of information and services allowing access from virtually anywhere in the world. Collaboration can be an effective means by which employees of a corporate enterprise, for example, or people, in general, can communicate to exchange data and information on certain topics of interest. However, given the location and connection capabilities at any point in time, participants may want to join independent of the need to rely on server or network systems.

With the advances in storage and computing power of computing systems, users now are capable of interacting with many different data types such as images, video clips, audio data, and textual data, for example. Moreover, the users can typically communicate using several types of devices with which to connect to a session. For example, one user can participate by audio/video from a conference room, another by voice via a desktop computer, and yet another by text input using a cell phone.

Collaboration, while using such disparate media capabilities, has traditionally been addressed at the server level by consolidating media processing capabilities locally. However, this is problematic in that more resources are required to administer such systems and these systems are more difficult to scale to meet conferencing demands. Advances in operating system behavior and capabilities, for example, now obviate the need to collaborate through servers thereby requiring new and more efficient APIs for accessing these capabilities for resolving device location, providing security, and the like, in a serverless communications environment.

SUMMARY

The following presents a simplified summary in order to provide a basic understanding of novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes an application programming interface (API) for starting and accessing distributed routing table (DRT) functionality in a serverless environment. The API facilitates bootstrapping into the DRT by one or more devices of a group of devices (a mesh) seeking to collaborate over a serverless connection. The API further provides for establishing a node of the DRT, where each node is an instance of an application that is participating in the collaborative mesh.

The DRT forms an overlay mesh on top of underlying transport (e.g., an IPv4 or IPv6 Network). The API facilitates node participation by allowing the application to search for keys published by other nodes in the mesh, or by becoming part of the mesh by publishing a key. When publishing a key, the node maintains a local routing table of other nodes in the mesh, with the selection of which nodes to include in the table being based on the key the node is locally publishing.

The API facilitates optimization of the routing table for quickly finding a root of a specific key in the mesh by finding the key directly in a cache or by asking a root node of the key that is in the local routing table that is closest numerically to the key being searched; the neighbor device in turn looks in its own local routing table and returns either the addresses of the required node or the addresses of the node publishing the key numerically closest in the local routing table.

The DRT API includes enumerations related to scope, security mode, status, match type, leaf set key change, and event type. API structures are related to a security provider, bootstrap provider, imposed settings on a local instance, registration, search information and results and event data.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
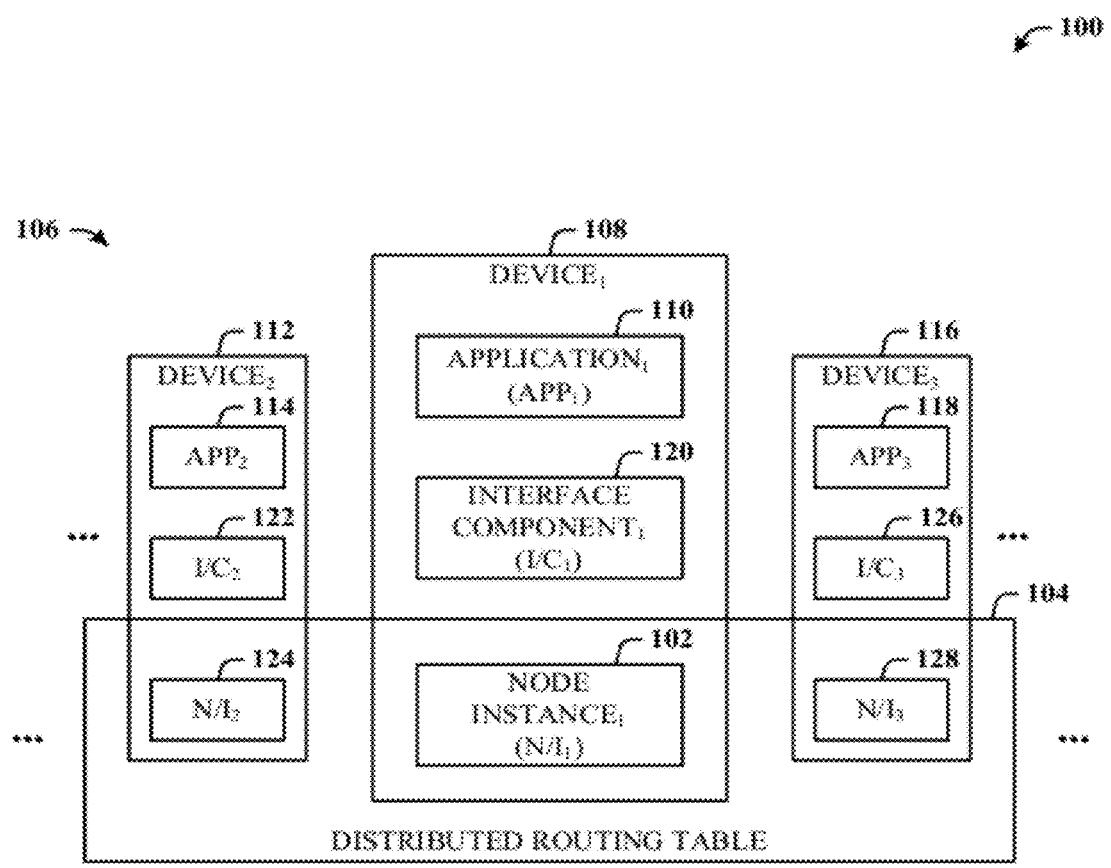
FIG. 1 illustrates a computer-implemented system that facilitates communications management.

Disclosed herein is a distributed routing table (DRT) application programming interface (API) for accessing the capabilities of the DRT. The DRT API is described in terms of behavior, which includes life cycle and state transitions, key registering and unregistering, and searching. The API enumerations, structures and functions are also described in detail.

The DRT is a serverless means whereby a collection of devices can collaborate. The DRT is a set of nodes that collaborate to construct an overlay routing table (which is stored in a distributed fashion) that can be used to determine a route from one node to another node (e.g., using a numeric ID to identify the destination node). Routes can be identified as a set of hops involving participating nodes. The DRT comprises local instances which reside on separate devices, but which are used by one device to find another device. In other words, each device uses a portion of the DRT for finding other devices.

The DRT is designed around a highly-componentized model. The heart of the system is a node component, which contains the protocol handlers and the core APIs. The node component references pluggable modules for separable subsystems that include routing table management, transport, bootstrap, security, and logging. Each module can be instantiated by an application (e.g., word processing), and a reference is passed to the node component.

Note that modules may be reused between multiple logical node instances, if the module itself supports that behavior. For example, a transport can multiplex a listening port and handle multiple nodes from one module. Conversely, a given security module might not support multiplexing for isolation and simplicity reasons.

Following are definitions of terms that may be used throughout the description. A distributed hash table (DHT) is a DRT with the added semantics of being able to insert a key/value pair into the distributed system such that the pair can later be retrieved by the publisher or another node (possibly subject to access control lists (ACLs)). The data is distributed amongst nodes based on an algorithm to ensure some level of reliability.

Peer name resolution protocol (PNRP) is a name resolution system that resolves names using routes generated by an underlying DRT platform.

A mesh is a group of nodes participating in a DRT. The term mesh can be used to scope the breadth of operations; for example, the node participates in routing only within a site or for the entire Internet or for all applications or for a single application.

A key is an integer of variable length used for routing, and conceptually, is equivalent to an IP address in IP routing.

A root is a node which is publishing a given key or the key closest to the value of a key.

A node is a particular instance of the DRT software running on a machine in a given mesh. Note that there can be multiple logical nodes on a single physical machine.

A routing entry is a small data structure containing a key and the endpoint information for the root of the key.

A local routing table is a collection of routing entries maintained on a single node to allow routing to next hops.

Reference is now made to the drawings, wherein like reference numerals are used to refer to like elements throughout. In the following description, for purposes of explanation, numerous specific details are set forth in order to provide a thorough understanding thereof. It may be evident, however, that the novel architecture can be practiced without these specific details. In other instances, well-known structures and devices are shown in block diagram form in order to facilitate a description thereof.

FIG. 1 illustrates a computer-implemented system 100 that facilitates communications management. The system 100 includes a node instance 102, which is a portion of a distributed routing table 104 for serverless collaboration between devices 106. As described supra, the DRT 104 can extend (or be distributed) across multiple devices 106 seeking to collaborate via a same application. In support thereof, a first device 108 (DEVICE$_1$) of the devices 106 includes an application 110 (denoted APPLICATION$_1$) via which collaboration will occur. Similarly, a second device 112 (DEVICE$_2$) includes a same type of application (APP$_2$) 114 for communicating data with the first application 110. Similarly, a third device 116 (DEVICE$_3$) includes a same type of application (APP$_3$) 118 for communicating with the first application 110 and the second application 114.

In this serverless environment, each of the devices 106 includes a separate node instance (N/I) of the DRT 104. Each node instance includes table entries of one or more other mesh devices (or node instances thereof). For example, if the first application 110 of the first device 108 communicates with the third application 118 of third device 116, this occurs via the node instances, which, as described above, include modules for supporting routing table management, transport, bootstrap, security, and logging. The DRT architecture is extensible in that other modules (e.g., customized) can be plugged in as developed by third-party vendors, for example.

An interface component (I/C) facilitates access to the corresponding node instances and determination of a route to a destination device. For example, the first device 108 includes a first interface component (I/C$_1$) 120 for starting and accessing the local instance (N/I$_1$) 102, the second device 112 includes a second interface component (I/C$_2$) 122 for starting and accessing a second local instance (N/I$_2$) 124, and the third device 116 includes a third interface component (I/C$_3$) 126 for starting and accessing a third local instance (N/I$_3$) 128.

In operation, the first application 110 can find the same type of application, the second application 114, by communicating with the third device 116. In other words, the first DRT node instance 102 may not include routing information for the second device 112, such that the first device 108 can communicate with the second device 112 directly. However, the third DRT node instance 128 of the third device 116 includes routing information that can direct the information of the first device application 110 to the second device application 114. As shown, there can be more devices 106 than are illustrated as well as node instances for the DRT 104.

Figure 2:
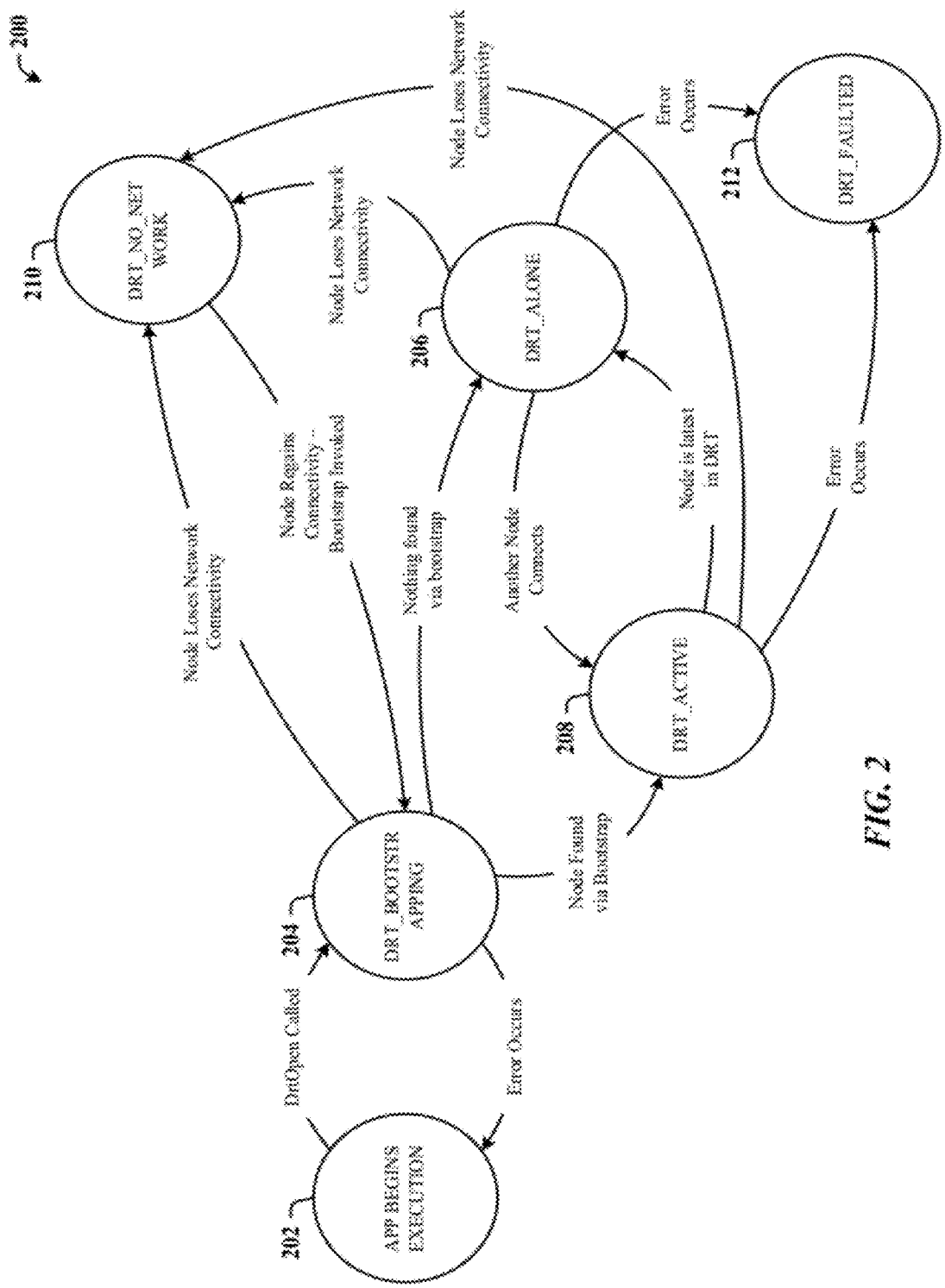
FIG. 2 illustrates a state diagram of different state transitions of a DRT local node instance, as facilitated by the DRT API.

FIG. 2 illustrates a state diagram 200 of different state transitions of a DRT local node instance, as facilitated by the DRT API. The diagram 200 also shows the different actions that can be taken on the DRT given a particular state. After an application has launched (at 202), the application can start a local instance (also referred to as a node instance, and a node) of a DRT by calling a method DrtOpen. After this call completes, the DRT is in a DRT_BOOTSTRAPPING state 204. This starts a node instance attempt to connect to a remote node via a bootstrap resolver module. While the node is attempting to bootstrap, it is in the DRT_BOOTSTRAPPING state 204. If the bootstrap process results in zero results, the node instance moves to DRT_ALONE state 206. If the node instance is able to bootstrap, the node moves to the DRT_ACTIVE state 208. After a node instance has reached the DRT_BOOTSTRAPPING state 204, the node instance can also register and unregister keys in the DRT.

Once a node instance successfully bootstraps into a DRT, the node instance moves into the DRT_ACTIVE state 208. Once in this state 208, the node instance is participating in the DRT. The node instance can move into multiple states from the DRT_ACTIVE state 208 depending on one or more conditions. If the network goes away, the node instance moves to a DRT_NO_NETWORK state 210. If for some reason the node is considered the last node in the DRT, the node will move into a DRT_ALONE state 206. Finally, if a cataclysmic event occurs, the DRT will move into a DRT_FAULTED state 212.

More specifically, if a node successfully discovers that no other node is currently in the DRT, the node moves into the DRT_ALONE state 206. Once in the alone state 206, the node listens for other nodes to connect to the DRT. A node can move into multiple states from the alone state 206 depending on the condition. If the network goes away, the node can moves into the DRT_NO_NETWORK state 210. Additionally, a new node (or node instance) in the device can be started and join the DRT, in which case the new node will move into the DRT_ACTIVE state 208. Again, if cataclysmic event occurs, the DRT local instance will move into the DRT_FAULTED state 212.

If a node loses network connectivity and moves into the DRT_NO_NETWORK state, the node can wait, and if network connectivity is restored, the infrastructure will restart the bootstrapping process and the node will move into the DRT_BOOTSTRAPPING state 204. If the node moves into the fault state 212, a cataclysmic event has occurred on the local node instance (e.g., the device running out of memory). At this point, the node calls a DrtClose method to shut down the node instance.

Figure 3:
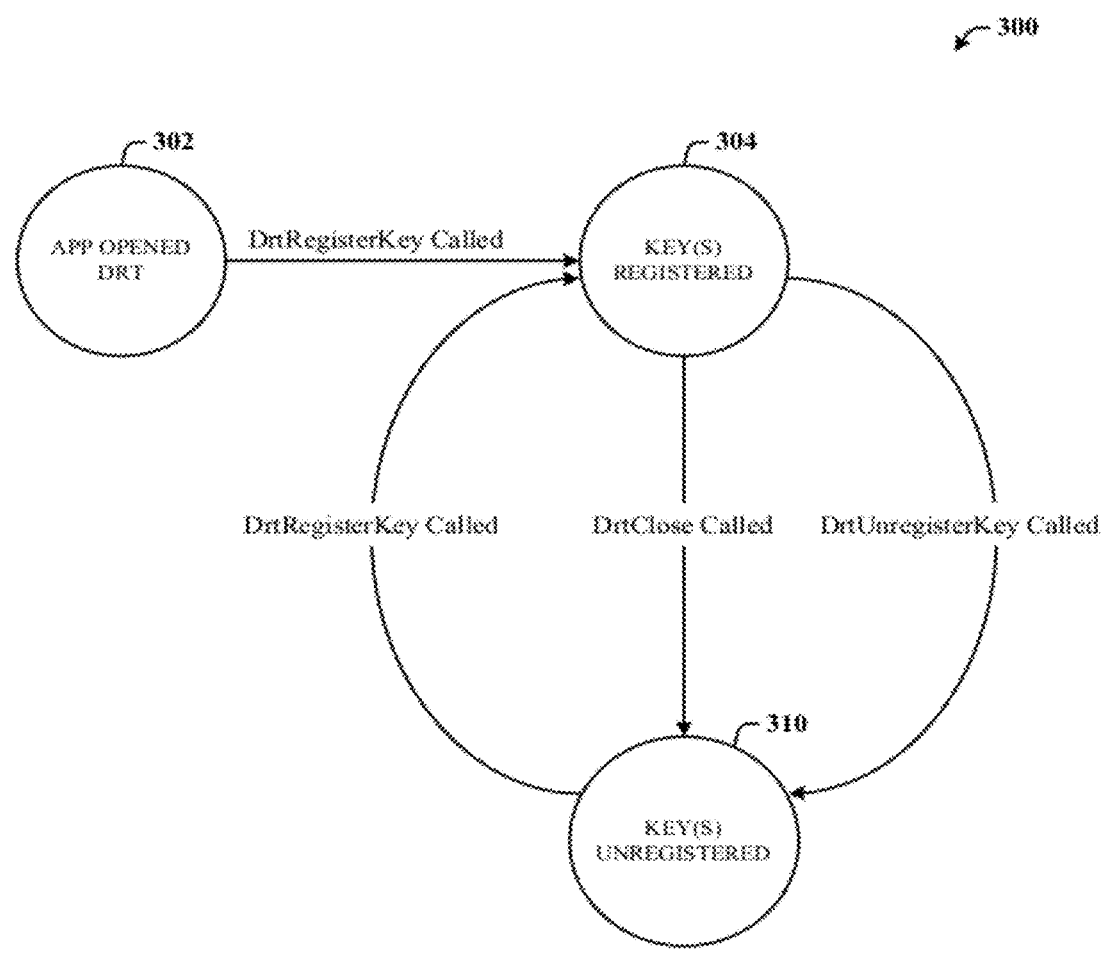
FIG. 3 illustrates a state diagram of state transitions of a DRT local node instance for key registration and unregistration, as facilitated by the DRT API.

FIG. 3 illustrates a state diagram 300 of state transitions of a DRT local node instance for key registration and unregistration, as facilitated by the DRT API. A node can register keys when the node is in the DRT_BOOTSTRAPPING state, DRT_ACTIVE state, DRT_ALONE state, and DRT_NO_NETWORK state. A node cannot register a key if it is in the DRT_FAULTED state. The node can unregister a key after the node has been registered. If the application calls DrtClose, the keys are unregistered by the infrastructure. Accordingly, at 302, an application opens a DRT local instance by calling a DrtRegisterKey method. State transitions to 304 where one or more keys are registered. State moves from 304 to 306 where keys are unregistered when the DrtClose method is called, or a DrtUnregisterKey method is called. State transitions from 306 to 304 if the DrtRegistyerKey method is called.

Figure 4:
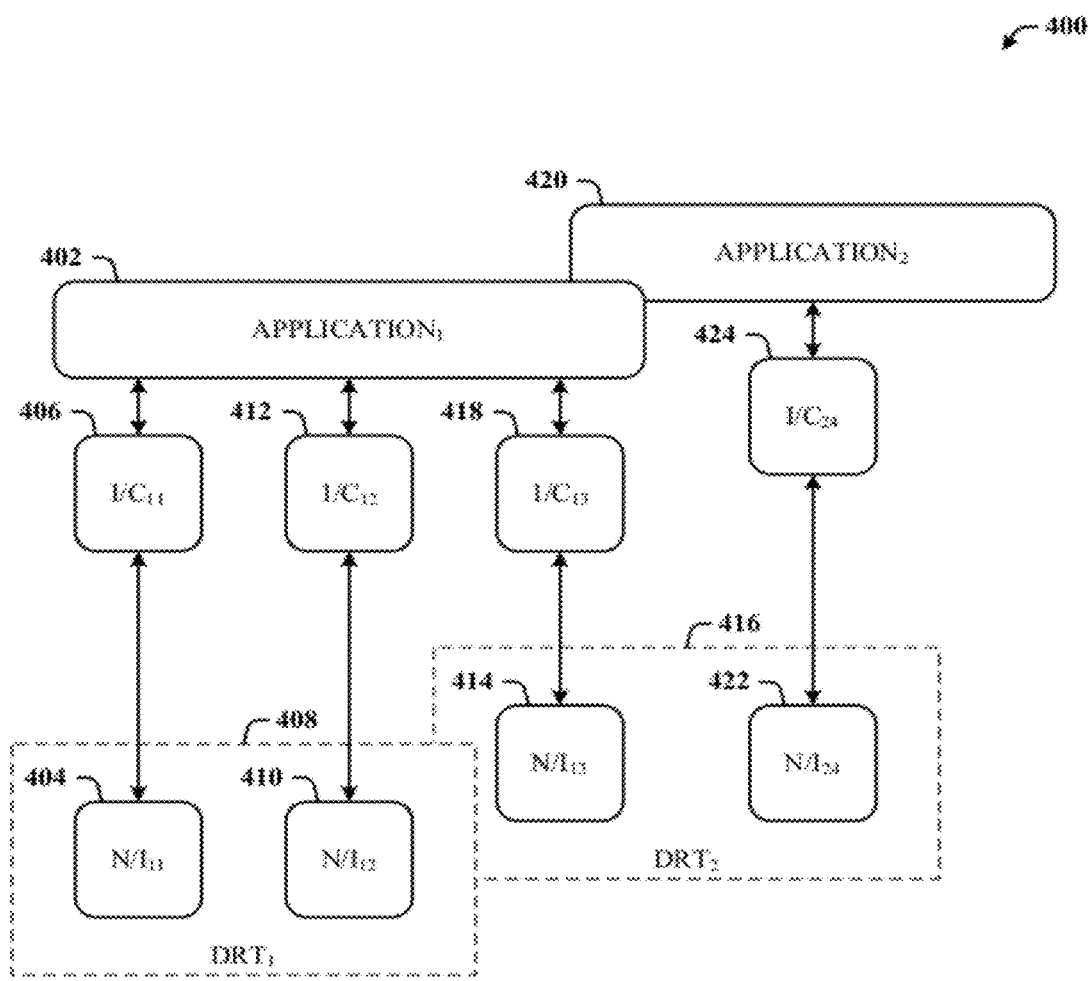
FIG. 4 illustrates a system that employs multiple DRT instances operating in a single device.

FIG. 4 illustrates a system 400 where there can be multiple DRT instances operating in a single device. There can be multiple mesh networks each supporting one application collaboration instance. In other words, a single device can have multiple applications running, where each application operates on a separate mesh for serverless collaboration purposes. Furthermore, a single application can be part of multiple mesh instances.

For example, a first application 402 (e.g., of a device or server) can start and access a first DRT local instance 404 via first interface component 406 (e.g., a DRT API). The first node instance 404 is illustrated as part of a first DRT mesh 408. Similarly, the first application 402 can start and access a second DRT local instance 410 via a second interface component 412, the second local instance 410 also part of the first DRT mesh 408.

The first application 402 can also be associated with a third DRT local node instance 414 on a different mesh, for example, a second mesh 416 (denoted DRT$_2$). The third node instance 414 can be started and accessed by the first application 402 via a third interface component 418. A second application 420 (e.g., of the same device) starts and accesses a fourth DRT local instance 422 on the second mesh 416 via a fourth interface component 424. Accordingly, an application (e.g., application 402) can start multiple different DRT node instances (e.g., instances 404, 410 and 414), of which the instances can be associated with different groups of nodes (e.g., DRT mesh 408 and DRT mesh 416). Moreover, a single device can include multiple applications (e.g., 402 and 420) each communicating over different mesh (e.g., 408 and 416) or a same mesh (e.g., 416). In an alternative implementation, it is to be understood that the interface components (406 and 412) can be a single interface component for starting and accessing the individual node instances (e.g., 404 and 410) for one application (e.g., 402). In yet another alternative implementation, the interface components (406, 412 and 418) associated with the first application 402 can be a single interface component for starting and accessing local node instances of the different mesh (408 and 416).

Figure 5:
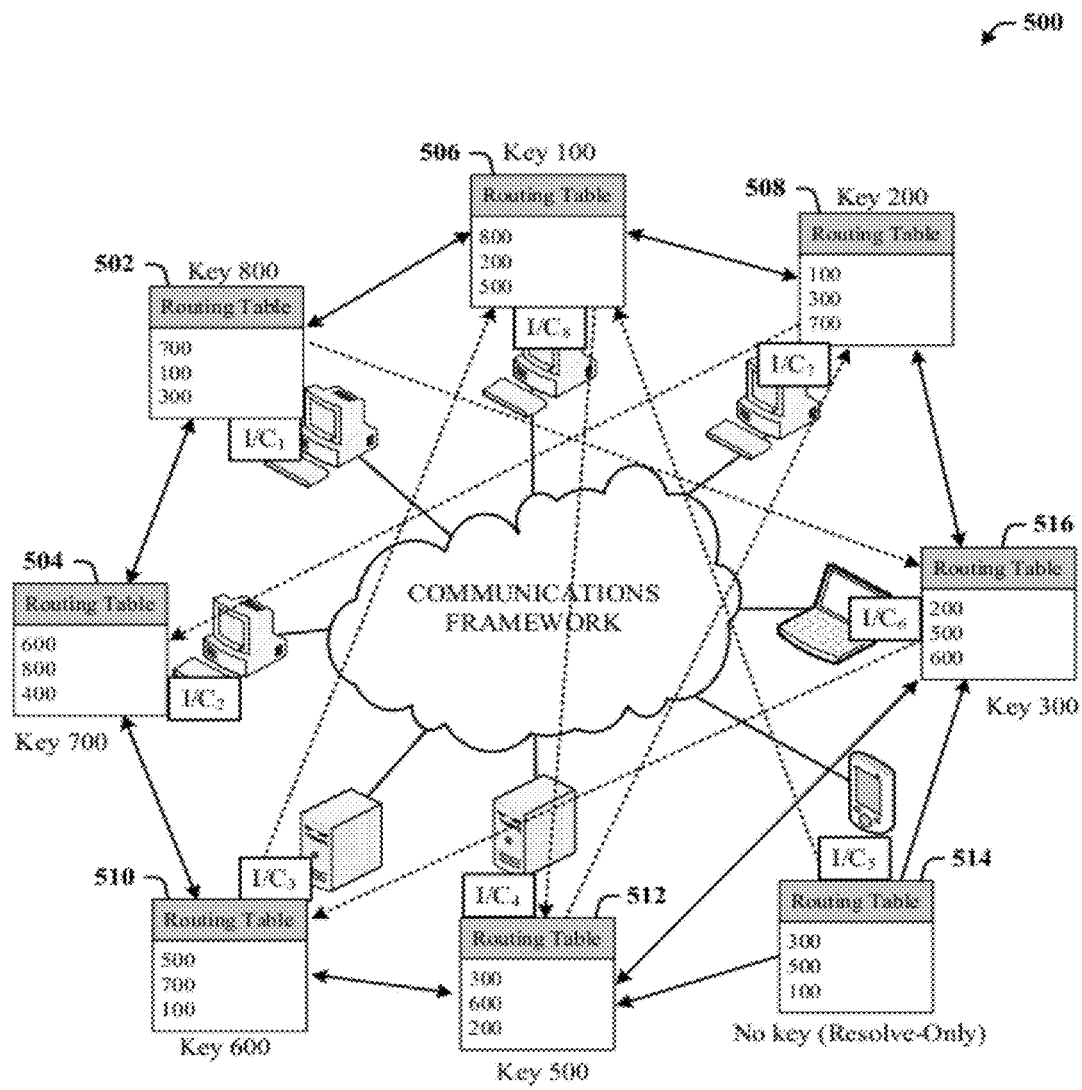
FIG. 5 illustrates a collection of devices communicating over a mesh using DRT API.

FIG. 5 illustrates a collection of devices 500 communicating over a mesh using DRT API. Here, the devices 500 include four desktop computers, a laptop computer, two servers and a portable terminal device. The four desktop computers include DRT APIs in the form of interface components I/C$_1$, I/C$_2$, I/C$_7$, and I/C$_8$ for starting and accessing associated local routing tables and modules. Similarly, the two servers are associated with interface components I/C$_3$ and I/C$_4$ and corresponding routing tables 510 and 512. The portable terminal device uses the interface component I/C$_5$ and routing table 514, and the laptop computer employs an interface component I/C$_6$ and routing table 516.

A search operation finds the root for a given key in the mesh. This is implemented via the searching node iteratively performing lookup operations with other nodes, until the target of the search is found. However, it should be noted that a recursive design could also be used in the implementation, with the searcher contacting a first hop, the first hop contacting a second hop, and so on.

The DRT forms an overlay mesh on top of underlying transport (normally an IPv4 or IPv6 network). Nodes can either participate by searching for keys published by nodes in the mesh, or by becoming part of the mesh by publishing keys. When publishing a key, the node maintains a local routing table of other nodes in the mesh, with the selection of which nodes to include in the table being based on the key the node is locally publishing.

The routing table is optimized in such a manner that it is possible to quickly find the root of a specific key in the mesh either by finding the key directly in the cache or by asking the root of the key that is in the local routing table that that is closest numerically to the key being searched for; the neighbor in turn looks in its own local routing table and returns either the addresses of the required node or the addresses of the node publishing the key numerically closest in the local routing table. This is repeated until either the required key is found or it has been determined that no such key exists. An example of such a routing scheme is implemented by PNRP.

The DRT can consist of nodes running in applications or services on a mix of servers, PCs or devices. The DRT runs in-proc with the owning application (e.g., spreadsheet). All threads are spawned using the same token as the application thread which calls the DRT. As such, the DRT can be used in a service with or without impersonation without issue.

Additionally, note that a given process can host multiple logical node instances. These instances can be for multiple different meshes that the application wishes to access (e.g., PNRP can access a global cloud mesh and a link-local cloud mesh at the same time). A single process could have two instances of the same mesh, but the only reason an application might wish to do that is if the application has multiple credentials and is creating an instance for each credential.

Figure 6:
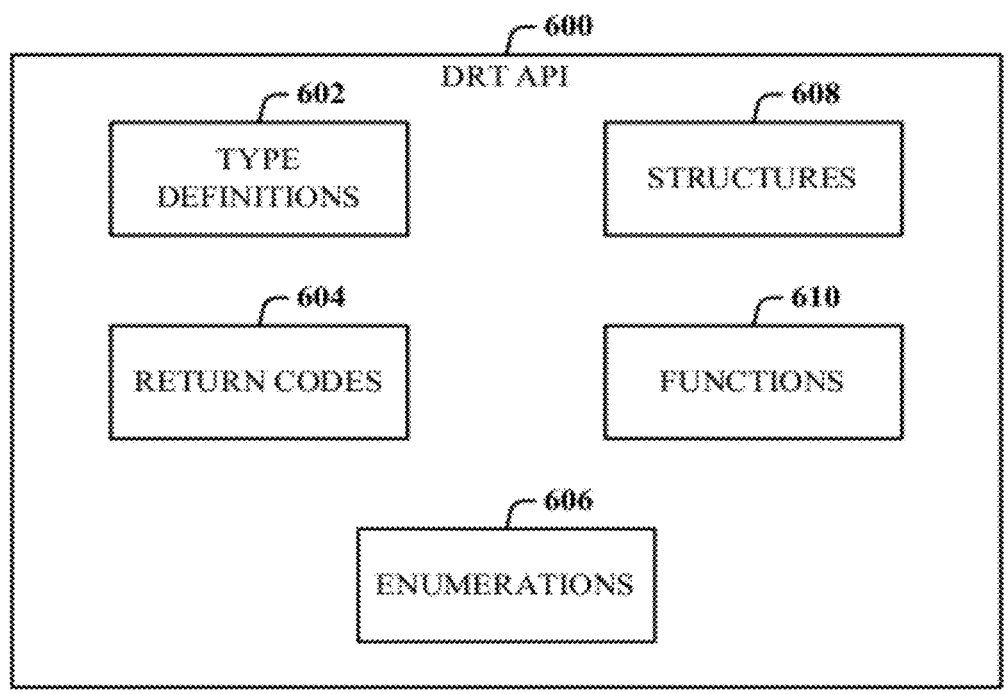
FIG. 6 illustrates a general diagram of the composition of the DRT API.

FIG. 6 illustrates a general diagram of the composition of the DRT API 600. The API 600 includes type definitions 602 (e.g., HDRT, HDRT_SEARCH_CONTEXT, HTRANSPORT and HKEYREGISTRATION). HDRT is a handle to a DRT, HDRT_SEARCH_CONTEXT is a handle to a search issued by an application, HTRANSPORT is a handle to a transport created by a transport creation API, and HKEY-REGISTRATION is a handle to a key that has been registered. The DRT API 600 also includes return codes 604 related to timeout, key size, message size, certificate chain, maximum addresses, search progress, key validity, port validity, security provider, usage, bootstrap, address validity and scope validity. The API 600 also includes enumerations 606 related to scope, security mode, status, match type, leaf set key change type, and event type. Structures 608 of the API 600 are related to data, security provider, bootstrap provider, settings, registration, search information, search results and event data.

Figure 7:
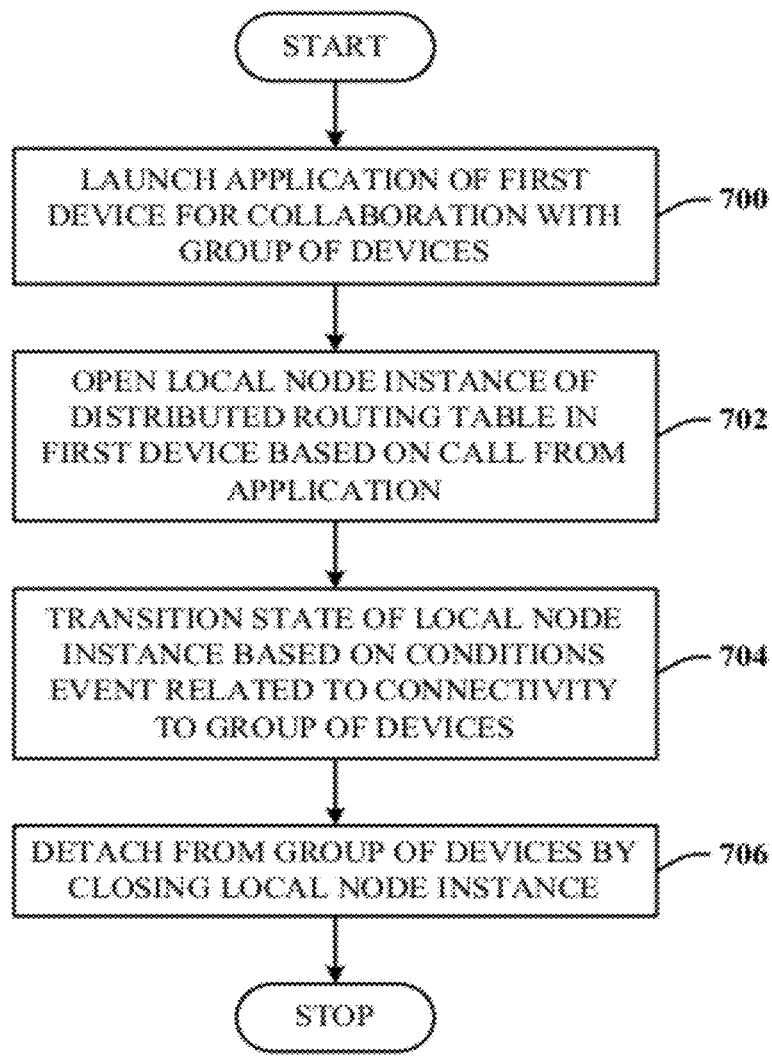
FIG. 7 illustrates method of managing communications using the DRT API.

FIG. 7 illustrates a method of managing communications using the DRT API. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 700, an application of a device is launched in furtherance of collaborating with a serverless group of devices. At 702, a local node instance of a distributed routing table is opened based on a call from the application. At 704, state of the local node instance transitions based on conditions related to connectivity to the group of devices. At 706, the device can detach from the group of de vices by closing the local node instance.

Figure 8:
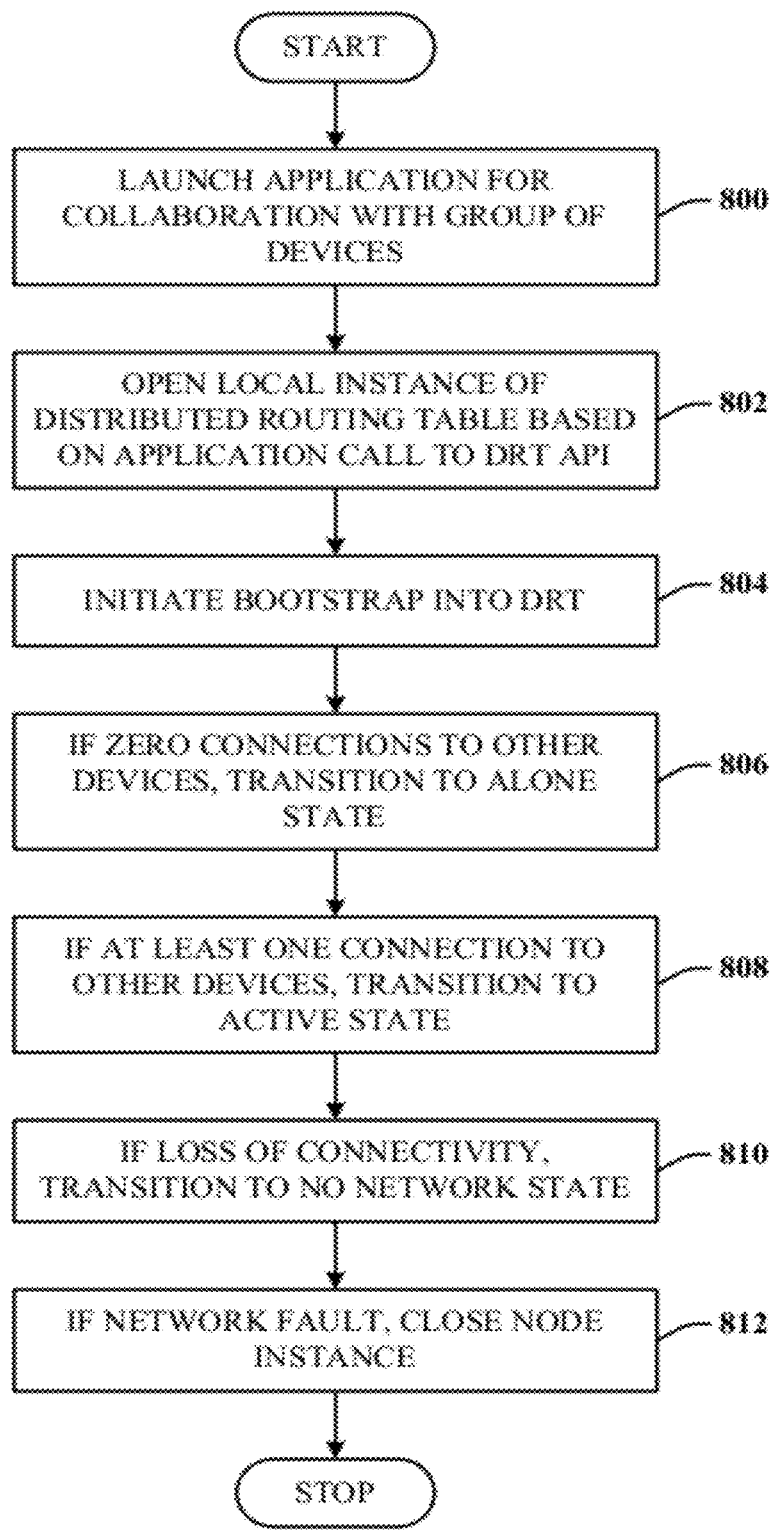
FIG. 8 illustrates a method of transitioning between state related to a DRT instance.

FIG. 8 illustrates a method of transitioning between state related to a DRT instance. At 800, an application is launched for collaboration with a group of devices. At 802, a local instance of a distributed routing table is opened based on a call from the application. At 804, a bootstrap process is initiated based on the call. At 806, if zero connections are obtained to other devices (or node instances thereof), transition is to an alone state. At 808, if at least one device connection is made, transition is to an active state. At 810, if loss of connectivity occurs, transition is to a no-network state. At 812, if a network fault is detected, the node instance is closed out.

Figure 9:
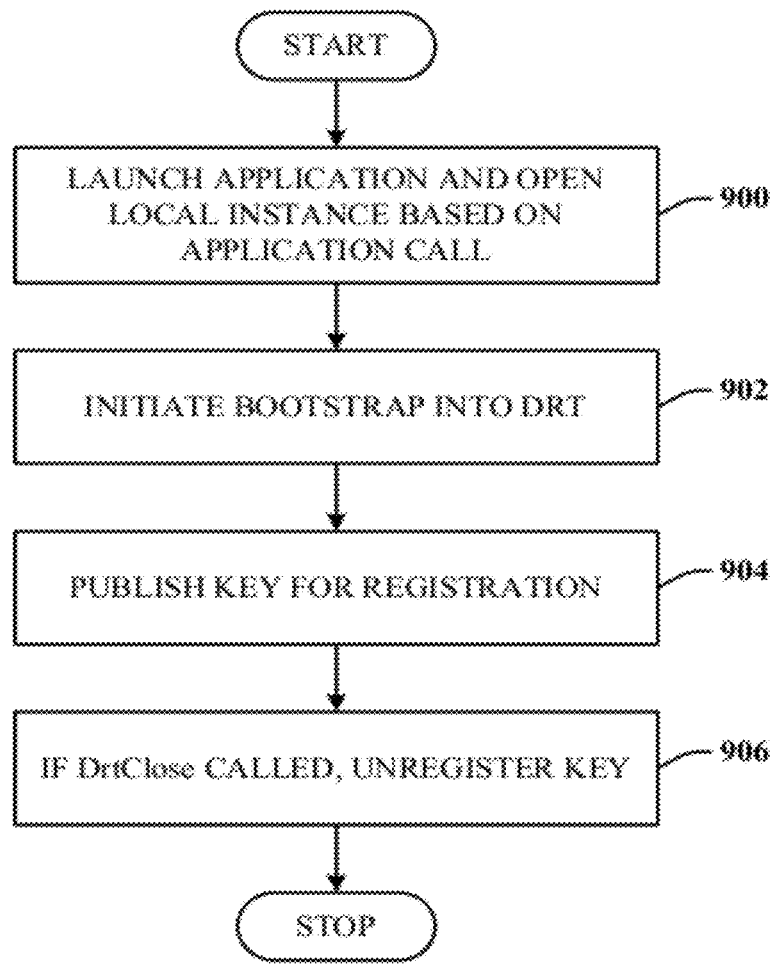
FIG. 9 illustrates a method of key processing for registration and unregistration.

FIG. 9 illustrates a method of key processing for registration and unregistration. At 900, an application is launched and a local instance opened based on an application call. At 902, a bootstrap state is entered. At 904, the local node instance publishes a key for registration. A node can register keys when in a bootstrap state, active state, alone state or no-network state. A node cannot register a key if in the faulted state. A node can unregister a key anytime after it has been registered. Accordingly, at 906, if the application calls a close method (e.g., DrtClose), all keys are unregistered by the infrastructure.

To search the DRT, the application creates a search query. This query can include several pieces of information for the application: the key to search the DRT for (specified through the search API); whether or not the infrastructure should search the local DRT instance for the key or just remote nodes; whether the search returns the path to a result; the number of results to return within a particular min/max range; and, whether the search should return only an exact match or the closest result(s).

An exact search instructs the infrastructure to look for the key that exactly matches the key being searched. If the infrastructure can find key, the result is returned; otherwise, no results are returned. A closest search instructs the infrastructure to look for the key that exactly matches the key being searched. If the infrastructure can find the key, the result is returned; otherwise, the closest result is returned. If the application chooses to get the closest "n" results, the application specifies a MaxEndpoint >1, which further instructs the infrastructure to return the exact match, plus "n−1" closest results, or "n" closest results, if no exact match is found.

Figure 10:
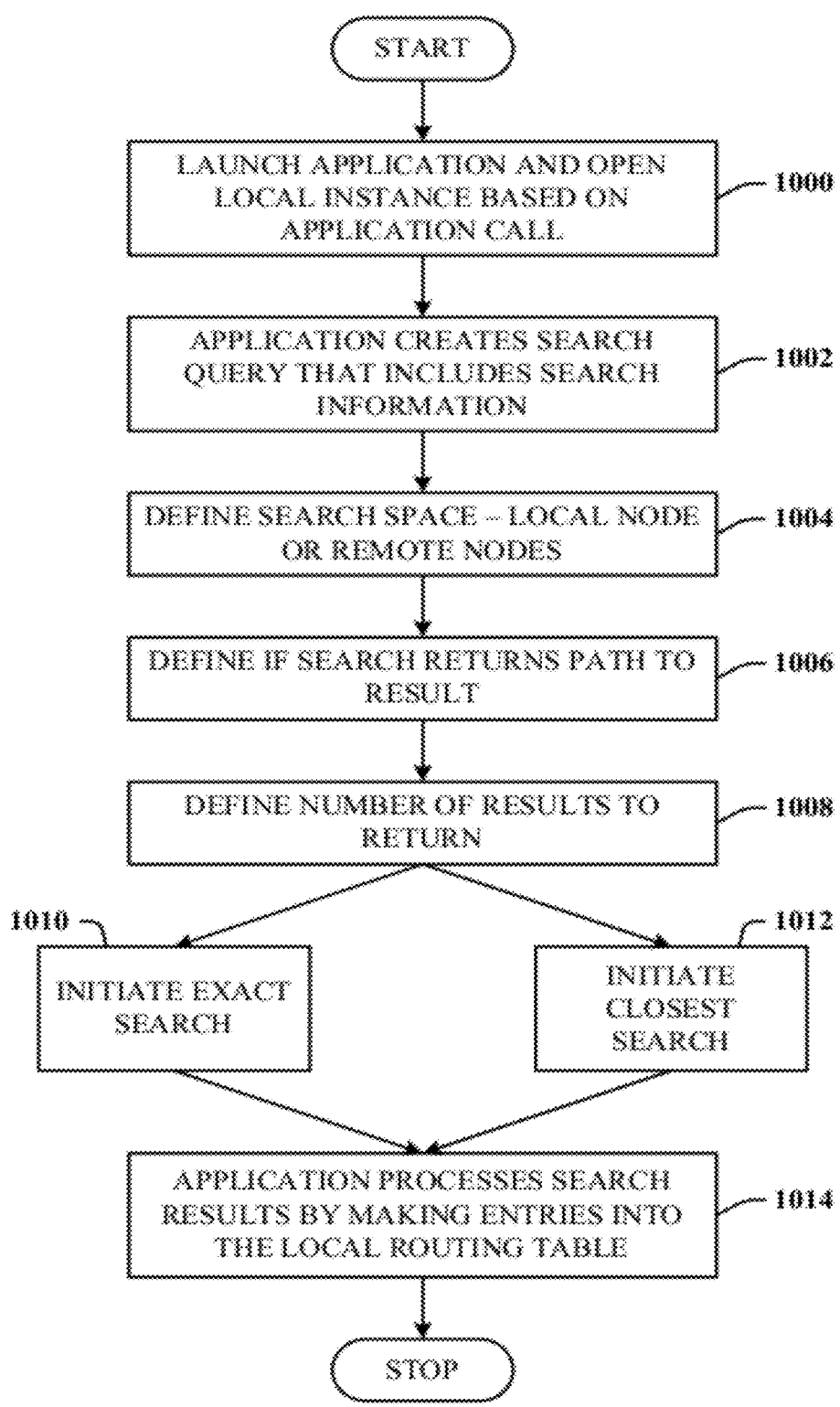
FIG. 10 illustrates a method of searching for a key in accordance with an implementation.

FIG. 10 illustrates a method of searching for a key in accordance with an implementation. At 1000, an application of a device is launched and a local instance opened based on an application call. At 1002, the application creates a search query that includes search information. At 1004, the information defines the search space—the local node or remote nodes. At 1006, the search information can also define if the search should return the path to the result. At 1008, the information can also define the number of results to return. At 1010, the search initiated is an exact search that returns an exact key match. Alternatively, at 1012, a closest search can be initiated. At 1014, the application receives and processes the results by updating the local routing table.

By specifying "fIterative=TRUE" for a search, the application chooses to be called back for each "hop" during the search. In other words, anytime the infrastructure communicates with a node during the search, the application will be able to obtain the key/endpoint pair of that node. The following table illustrates fIterative=TRUE search behavior.

| | MaxEndpoints = 1 | MaxEndpoints >1 |
|---|---|---|
| Exact Match (MaximumKey and MinimumKey are the same value) | The application's search handle will be signaled at each hop Each result will contain the key from the hop's cache that the infrastructure will attempt to communicate with next. | Will return one match if this is specified |
| Closest Match (MaximumKey and MinimumKey specify a range of values) | The application's search handle will be signaled at each hop Each result will contain the key from the hop's cache that the infrastructure will attempt to communicate with next. | Error - this search configuration is not supported. |

The last result from every search will be a final callback, with a failed hr (DRT_E_NO_MORE). This assumes the application is returning "true" from the result callback to allow the search process to run its full course. If the callback returns false, no more callbacks will happen.

The following table illustrates fIterative=FALSE search behavior.

| | MaxEndpoints = 1 | MaxEndpoints > 1 |
|---|---|---|
| Exact Match (MaximumKey and MinimumKey are the same value) | The application's search handle will be signaled 1 time with the exact match data. | Will return 1 match if this is specified. |

|  | MaxEndpoints = 1 | MaxEndpoints > 1 |
|---|---|---|
| Closest Match (MaximumKey and MinimumKey specify a range of values) | The application's search handle will be signaled 1 time with the closest (possibly exact) match. | The application's search handle will be signaled up to MaxEndpoints times. The first result will be the first closest (or exact) result. |

Following is a description of type definitions, enumerations, structures and functions of the DRT API. These are the types used throughout the DRT API.

```
typedef PVOID HDRT;
typedef PVOID HDRT_SEARCH_CONTEXT;
typedef PVOID HTRANSPORT;
typedef PVOID HKEYREGISTRATION;
```

| Name | Description |
|---|---|
| HDRT | Handle to a DRT - This is the applications representation of a DRT opened via DrtOpen |
| HDRT_SEARCH_CONTEXT | Handle to a search issued by the application via DrtStartSearch. This handle is used to end a search via DrtEndSearch. |
| HTRANSPORT | Handle to a transport created by the transport creation API. This is used to open a DRT with a specified transport via the DRT_SETTINGS structure. Currently only IPv6 UDP is supported via DrtCreateIpv6UdpTransport. |
| HKEYREGISTRATION | Handle to a key that has been registered |

Following are DRT-specific return codes returned by the API. See the functions section for what error codes are returned by which API specifically.

```
#define FACILITY_DRT 98
#define DRT_E_TIMEOUT
MAKE_HRESULT(SEVERITY_ERROR, FACILITY_DRT, 0x1001)
#define DRT_E_INVALID_KEY_SIZE
MAKE_HRESULT(SEVERITY_ERROR, FACILITY_DRT, 0x1002)
#define DRT_E_INVALID_MESSAGE_SIZE
MAKE_HRESULT(SEVERITY_ERROR, FACILITY_DRT, 0x1003)
#define DRT_E_INVALID_CERT_CHAIN
MAKE_HRESULT(SEVERITY_ERROR, FACILITY_DRT, 0x1004)
#define DRT_E_INVALID_MESSAGE
MAKE_HRESULT(SEVERITY_ERROR, FACILITY_DRT, 0x1005)
#define DRT_E_NO_MORE
MAKE_HRESULT(SEVERITY_ERROR, FACILITY_DRT, 0x1006)
#define DRT_E_INVALID_MAX_ADDRESSES
MAKE_HRESULT(SEVERITY_ERROR, FACILITY_DRT, 0x1007)
#define DRT_E_SEARCH_IN_PROGRESS
MAKE_HRESULT(SEVERITY_ERROR, FACILITY_DRT, 0x1008)
#define DRT_E_INVALID_KEY
MAKE_HRESULT(SEVERITY_ERROR, FACILITY_DRT, 0x1009)
#define DRT_E_TARGET_NOT_IN_RANGE
MAKE_HRESULT(SEVERITY_ERROR, FACILITY_DRT, 0x100a)
#define DRT_E_INVALID_PORT
MAKE_HRESULT(SEVERITY_ERROR, FACILITY_DRT, 0x2000)
#define DRT_E_INVALID_TRANSPORT
MAKE_HRESULT(SEVERITY_ERROR, FACILITY_DRT, 0x2001)
#define DRT_E_INVALID_SEC_PROVIDER
MAKE_HRESULT(SEVERITY_ERROR, FACILITY_DRT, 0x2002)
#define DRT_E_STILL_IN_USE
MAKE_HRESULT(SEVERITY_ERROR, FACILITY_DRT, 0x2003)
#define DRT_E_INVALID_BOOTSTRAP
MAKE_HRESULT(SEVERITY_ERROR, FACILITY_DRT, 0x2004)
#define DRT_E_INVALID_ADDRESS
MAKE_HRESULT(SEVERITY_ERROR, FACILITY_DRT, 0x2005)
#define DRT_E_INVALID_SCOPE
MAKE_HRESULT(SEVERITY_ERROR, FACILITY_DRT, 0x2006)
#define E_TRANSPORT_SHUTTING_DOWN
MAKE_HRESULT(SEVERITY_ERROR, FACILITY_DRT, 0x2007)
#define DRT_E_PROVIDER_IN_USE
MAKE_HRESULT(SEVERITY_ERROR, FACILITY_DRT, 0x2008)
#define DRT_E_PROVIDER_NOT_ATTACHED
MAKE_HRESULT(SEVERITY_ERROR, FACILITY_DRT, 0x2009)
#define DRT_E_TRANSPORT_ALREADY_BOUND
MAKE_HRESULT(SEVERITY_ERROR, FACILITY_DRT, 0x2101)
#define DRT_E_TRANSPORT_NOT_BOUND
MAKE_HRESULT(SEVERITY_ERROR, FACILITY_DRT, 0x2102)
#define DRT_E_TRANSPORT_UNEXPECTED
MAKE_HRESULT(SEVERITY_ERROR, FACILITY_DRT, 0x2103)
#define DRT_E_TRANSPORT_INVALID_ARGUMENT
MAKE_HRESULT(SEVERITY_ERROR, FACILITY_DRT, 0x2104)
#define DRT_E_TRANSPORT_NO_DEST_ADDRESSES
MAKE_HRESULT(SEVERITY_ERROR, FACILITY_DRT, 0x2105)
#define DRT_E_TRANSPORT_EXECUTING_CALLBACK
MAKE_HRESULT(SEVERITY_ERROR, FACILITY_DRT, 0x2106)
#define DRT_E_TRANSPORT_ALREADY_EXISTS_FOR_SCOPE
MAKE_HRESULT(SEVERITY_ERROR, FACILITY_DRT, 0x2107)
#define DRT_S_TIMEOUT
MAKE_HRESULT(SEVERITY_SUCCESS, FACILITY_DRT, 0x4001)
#define DRT_PAYLOAD_REVOKED (1<<0)
```

| Name | Description |
|---|---|
| DRT_E_TIMEOUT | Error: A timeout has occurred |
| DRT_E_INVALID_KEY_SIZE | Error: The key/key size passed in is invalid |
| DRT_E_INVALID_MESSAGE_SIZE | Error: The message size specified is invalid |
| DRT_E_INVALID_CERT_CHAIN | Error: The cert chain specified is invalid |
| DRT_E_INVALID_MESSAGE | Error: The message specified is invalid |
| DRT_E_NO_MORE | No more results are available for a given search |
| DRT_E_INVALID_MAX_ADDRESSES | Error: The maximum amount of addresses specified is invalid |
| DRT_E_SEARCH_IN_PROGRESS | Error: A search is already in progress |
| DRT_E_INVALID_KEY | Error: The key specified is invalid given the security provider being used |
| DRT_E_INVALID_PORT | Error: The port is invalid - probably because it is already in use. |
| DRT_E_INVALID_TRANSPORT | Error: The transport referenced by the handle is invalid and does not adhere to the specified interface contract |
| DRT_E_INVALID_SEC_PROVIDER | Error: The security provider specified is invalid |
| DRT_E_STILL_IN_USE | Error: The DRT is still in use. |
| DRT_E_INVALID_BOOTSTRAP | Error: The bootstrap provider specified is invalid |
| DRT_E_INVALID_ADDRESS | Error: The address specified is invalid |
| DRT_E_INVALID_SCOPE | Error: The scope specified is invalid |
| DRT_S_TIMEOUT | Success: The operation timed out |

Following are enumerations employed by the DRT API. The DRT SCOPE enumeration specifies the IPv6 scope in which the DRT will operate if when using an IPv6 UDP transport created by DrtCreateIpv6UdpTransport. The enumeration also indirectly specifies the scope a PNRP bootstrap resolver—created by DrtCreatePnrpBootstrapResolver—will use to find other participating nodes.

```
typedef enum drt_scope_tag
{
    DRT_GLOBAL_SCOPE        = 1,
    DRT_SITE_LOCAL_SCOPE    = 2,
    DRT_LINK_LOCAL_SCOPE    = 3,
} DRT_SCOPE;
```

| Name | Description |
| --- | --- |
| DRT_GLOBAL_SCOPE | When setting up an IPv6 UDP transport via the DrtCreateIpv6UdpTransport API, listen on only the global scope |
| DRT_SITE_LOCAL_SCOPE | When setting up a IPv6 UDP transport via the DrtCreateIpv6UdpTransport API, listen on only the site-local scope. |
| DRT_LINK_LOCAL_SCOPE | When setting up a IPv6 UDP transport via the DrtCreateIpv6UdpTransport API, listen on only the link local scope |

The DRT_SECURITY_MODE is a DRT_SETTINGS field that specifies the security mode the DRT should operate under. By default 10% of the cache and the final node in a search are authenticated.

```
typedef enum drt_security_mode_tag
{
    DRT_SECURE_RESOLUTION   = 0,
    DRT_SECURE_ROUTE        = 1,
} DRT_SECURITY_MODE;
```

| Name | Description |
| --- | --- |
| DRT_SECURE_RESOLUTION | Authenticate percentage (e.g., 10%) of the cache and the final node(s) being searched for |
| DRT_SECURE_ROUTE | Authenticate percentage (e.g., 10%) of the cache and the final node(s) being searched for plus all nodes in the route to the search result(s) |

The different status a DRT can have is captured in DRT_STATUS. DRT_STATUS reflects status of the local node.

```
typedef enum drt_status_tag
{
    DRT_ACTIVE = 0,
    DRT_ALONE = 1,
    DRT_NO_NETWORK = 10,
    DRT_FAULTED = 20,
} DRT_STATUS;
```

| Name | Description |
| --- | --- |
| DRT_BOOTSTRAPPING | The local node is attempting to bootstrap into the DRT mesh. |
| DRT_ACTIVE | The local node is "connected" to the mesh - there are remote nodes in the local node's cache and it is participating in the DRT system |
| DRT_ALONE | The local node is waiting for remote nodes to join the mesh - there are remote nodes in the local node's cache and it is participating in the DRT system |
| DRT_NO_NETWORK | The local node does not have network connectivity |
| DRT_FAULTED | An unknown error has occurred on the local node - the local node can then only call DrtClose and try to open/setup the DRT again |

DRT_MATCH_TYPE is the type of result returned via the search event when a search is performed.

```
typedef enum drt_match_type_tag
{
    DRT_MATCH_EXACT         = 0,
    DRT_MATCH_NEAR          = 1,
    DRT_MATCH_INTERMEDIATE  = 2,
} DRT_MATCH_TYPE;
```

| Name | Description |
| --- | --- |
| DRT_MATCH_EXACT | The data/node being returned by the search callback has the requested key |
| DRT_MATCH_NEAR | The data/node being returned by the search callback is the closest the DRT could find to the requested key |
| DRT_MATCH_INTERMEDIATE | The data/node being returned by the search callback is only and intermediate node, it is not the closest or exact match - an application will only receive this node match type if fIterative = TRUE |

DRT_LEAFSET_KEY_CHANGE_TYPE is the type of change that occurs to a leaf set node in the local DRT cache.

```
typedef enum drt_leafset_key_change_type_tag {
    DRT_LEAFSET_KEY_ADDED   = 0,
    DRT_LEAFSET_KEY_DELETED = 1,
} DRT_LEAFSET_KEY_CHANGE_TYPE;
```

| Name | Description |
| --- | --- |
| DRT_LEAFSET_KEY_ADDED | A key/node was added to the local node's DRT leaf set |
| DRT_LEAFSET_KEY_DELETED | A key/node was deleted from the local node's DRT leaf set |
| DRT_LEAFSET_KEY_UPDATED | A key/node in the local nodes DRT leaf set was updated |

DRT_EVENT_TYPE is an event has occurred in the DRT. The event handle passed into DrtOpen is signaled with one of the following events.

```
typedef enum drt_event_type_tag
{
    DRT_EVENT_STATUS_CHANGED      = 0,
    DRT_EVENT_LEAFSET_KEY_CHANGED = 1,
} DRT_EVENT_TYPE;
```

| Name | Description |
| --- | --- |
| DRT_EVENT_STATUS_CHANGED | The status of the local DRT instance has changed |
| DRT_EVENT_LEAFSET_KEY_CHANGED | A key/node was changed from the local node's DRT leaf set |

Following is a summary of structures included as part of the DRT API. DRT_DATA is a data blob used throughout the DRT API.

```
typedef struct drt_data_tag
{
    ULONG cb;
    BYTE *pb;
} DRT_DATA, *PDRT_DATA;
typedef const DRT_DATA *PCDRT_DATA;
```

| Name | Description |
| --- | --- |
| cb | Count of bytes |
| *pb | Pointer to byte array |

DRT_SECURITY_PROVIDER. The following structure defines the interface that can be implemented by a security provider:

```
typedef struct drt_security_provider_tag
{
    PVOID pvContext;
    HRESULT (*RegisterKey)(
        __in_opt   PVOID pvContext,
        __in       const DRT_REGISTRATION *pRegistration,
        __in_opt   PVOID pvKeyContext);
    HRESULT (*UnregisterKey)(
        __in_opt   PVOID pvContext,
        __in       constDRT_DATA *pKey,
        __in_opt   PVOID pvKeyContext);
    HRESULT (*ValidateAndUnpackPayload)(
        __in_opt   PVOID pvContext,
        __in       DRT_DATA* pSecuredAddressPayload,
        __in_opt   DRT_DATA* pCertChain,
        __in_opt   DRT_DATA* pClassifier,
        __in_opt   DRT_DATA* pNonce,
        __in_opt   DRT_DATA* pSecuredPayload,
        __out      BYTE* pbProtocolMajor,
        __out      BYTE* pbProtocolMinor,
        __out      DRT_DATA* pKey,
        __out_opt  DRT_DATA* pPayload,
        __out      CERT_PUBLIC_KEY_INFO** ppPublicKey,
        __out_opt  SOCKET_ADDRESS_LIST** ppAddressList,
        __out      DWORD* pdwFlags);
    HRESULT (*SecureAndPackPayload)(
        __in_opt   PVOID pvContext,
        __in_opt   PVOID pvKeyContext,
        BYTE bProtocolMajor,
        BYTE bProtocolMinor,
        DWORD dwFlags,
        __in       const DRT_DATA* pKey,
        __in_opt   const DRT_DATA* pPayload,
        __in_opt   const SOCKET_ADDRESS_LIST* pAddressList,
        __in       const DRT_DATA* pNonce,
        __out      DRT_DATA* pSecuredAddressPayload,
        __out_opt  DRT_DATA* pClassifier,
        __out_opt  DRT_DATA* pSecuredPayload,
        __out_opt  DRT_DATA* pCertChain);
    void (*FreeData)(
        __in_opt   PVOID pvContext,
        __in_opt   PVOID pv);
} DRT_SECURITY_PROVIDER, *PDRT_SECURITY_PROVIDER;
typedef const DRT_SECURITY_PROVIDER *PCDRT_SECURITY_PROVIDER;
```

| Name | Description |
| --- | --- |
| pvContext | This pointer is specified by the application when passing this structure to DrtOpen. The DRT treats it as an opaque pointer, and passes it as the first parameter to the functions referenced by this structure. An application will generally use this as a pointer to the security provider state or the "this pointer" of the object that implements the security provider functionality. |

RegisterKey. When an application attempts to register a key, the key is passed to this interface for validation by the security provider before completing the registration.

| Name | Description |
| --- | --- |
| pvContext | Used to pass the value of DRT_SECURITY_PROVIDER.pvContext |
| pRegistration | Pointer to the DRT registration structure, the application created and passed to DrtRegisterKey |
| pvKeyContext | Pointer to the context, the application created and passed to DrtRegisterKey |

UnregisterKey. When an application attempts to unregister a key, the key is passed to this interface for validation by the security provider before completing the unregister call.

| Name | Description |
| --- | --- |
| pvContext | Used to pass the value of DRT_SECURITY_PROVIDER.pvContext |
| pRegistration | Pointer to the DRT registration structure, the application created and passed to DrtRegisterKey |
| pvKeyContext | Pointer to the context, the application created and passed to DrtRegisterKey |

ValidateAndUnpackPayload. This function is called when an authority message is received on the wire. The function is responsible for validating the data received, and for unpacking the service addresses, revoked flag, and nonce from a secured address payload.

| Name | Description |
|---|---|
| pvContext | Used to pass the value of DRT_SECURITY_PROVIDER.pvContext |
| pSecuredAddressPayload | The payload received on the wire which contains the service addresses, revoked flag, nonce, and possibly other data required by the security provider |
| pCertChain | The cert chain received in the authority message |
| pClassifier | The classifier received in the authority message |
| pNonce | The nonce that was sent in the original Inquire or Lookup message. This value should be compared to the value embedded in the Secured Address Payload to ensure the same. This value can be 16 bytes. |
| pSecuredPayload | The application data payload received in the Authority message. After validation, the original data (after decryption, removal of signature, etc.) is output as pPayload |
| pbProtocolMajor | Pointer to byte array that represents the protocol major version |
| pbProtocolMinor | Pointer to byte array that represents the protocol minor version |
| pKey | The key for which this payload is registered |
| pPayload | The original payload specified by the remote application. pPayload->pb is allocated by the security provider, and will be freed by the DRT by calling FreeData |
| ppPublicKey | The number of service addresses embedded in the Secured Address Payload |
| ppAddresses | The service addresses that were embedded in the Secured Address Payload. ppAddresses is allocated by the security provider, and will be freed by the DRT by calling FreeData |
| pdwFlags | Any DRT specific flags, currently defined only to be the revoked (or deleted) flag that need to be unpacked for the local DRT instance processing. |

Return Value: S_OK is returned if the payload is valid, an error code otherwise.

SecureAndPackPayload. This function is called when an Authority message is about to be sent on the wire. It is responsible for securing the data that will be sent, and for packing the service addresses, revoked flag, nonce, and possibly other application data into the Secured Address Payload. Following is a table of parameters.

| Name | Description |
|---|---|
| pvContext | Used to pass the value of DRT_SECURITY_PROVIDER.pvContext |
| pKeyContext | The context passed into DrtRegisterKey when the key was registered |
| pbProtocolMajor | Pointer to byte array that represents the protocol major version |
| pbProtocolMinor | Pointer to byte array that represents the protocol minor version |
| dwFlags | Any DRT specific flags, currently defined only to be the revoked (or deleted) flag that need to be packed, secured and sent to another instance for processing. |
| pKey | The key for which this payload is registered |
| pPayload | The payload specified by the application when calling DrtRegisterKey |
| pAddressList | The service addresses that are to be embedded in the Secured Address Payload |
| pNonce | The nonce that was sent in the original Inquire or Lookup message. This value is always 16 bytes |

| Name | Description |
|---|---|
| pSecuredAddressPayload | The payload to send on the wire which contains the service addresses, revoked flag, nonce, and possibly other data required by the security provider. pSecuredAddressPayload->pb is allocated by the security provider, and will be freed by the DRT by calling FreeData. |
| pClassifier | The classifier to send in the Authority message. pClassifier->pb is allocated by the security provider, and will be freed by the DRT by calling FreeData |
| pSecuredPayload | The application data payload received in the Authority message. After validation, the original data (after decryption, removal of signature, etc.) is output as pPayload. pSecuredPayload->pb is allocated by the security provider, and will be freed by the DRT by calling FreeData |
| pCertChain | The cert chain to send in the Authority message. pCertChain->pb is allocated by the security provider, and will be freed by the DRT by calling FreeData |

Return Value: S_OK is returned if the secure operation succeeded; otherwise, an error code.

The FreeData function is called to free data that the security provider allocated in calls to ValidateAndUnpackPayload and SecureAndPackPayload.SecureAndPackPayload. The following table indicates parameters for this function.

| Name | Description |
|---|---|
| pvContext | Used to pass the value of DRT_SECURITY_PROVIDER.pvContext |
| pv | The data to be freed |

DRT_BOOTSTRAP_PROVIDER

```
typedef PVOID BOOTSTRAP_RESOLVE_CONTEXT;
typedef void (CALLBACK* BOOTSTRAP_RESOLVE_CALLBACK)
(HRESULT hr, PVOID pvContext, SOCET_ADDRESS_LIST*
pAddresses);
typedef struct DRT_BOOTSTRAP_PROVIDER_tag
{
    PVOID pContext;
    HRESULT (*Attach)(
        __in        const PVOID pvContext
        );
    VOID (*Detach)(
        __in        const PVOID pvContext
        );
    HRESULT (*Resolve)(
        __in        const PVOID pvContext,
                    BOOL fSplitDetect,
                    ULONG timeout,
                    ULONG cMaxResults,
        __in        const PVOID pvCallbackContext,
                    BOOTSTRAP_RESOLVE_CALLBACK
                    callback);
        __out       BOOTSTRAP_RESOLVE_CONTEXT*
                    ResolveContext
        );
    VOID (*EndResolve)(
        __in        const PVOID pvContext);
        __in        BOOTSTRAP_RESOLVE_CONTEXT
                    ResolveContext
        );
```

-continued

```
    HRESULT (*Register)(
        __in        const PVOID pvContext,
        __in        const SOCKET_ADDRESS_LIST*
                    pAddressList);
    VOID (*Unregister)(
        __in        const PVOID pvContext
        );
} DRT_BOOTSTRAP_PROVIDER,
*PDRT_BOOTSTRAP_PROVIDER;
typedef const DRT_BOOTSTRAP_PROVIDER
*PCDRT_BOOTSTRAP_PROVIDER;
```

| Name | Description |
|---|---|
| pContext | Pointer to a resolver defined context - it is up to the developer creating a bootstrap resolver to fill this in with the needed information - oftentimes this is a "this" pointer. This context gets passed to all the context parameters in the functions defined by the DRT_BOOTSTRAP_MODULE. |

The resolver function resolves to an endpoint that can be used to bootstrap the cache of the DRT.

| Name | Description |
|---|---|
| pvContext | Used to pass the value of DRT_BOOTSTRAP_PROVIDER pvContext |
| fSplitDetect | Whether or not the resolve is being used for split detection and recovery |
| timeout | The maximum time a resolve should take before timing out. |
| cMaxResults | The maximum number of results to return as a result of the resolve |
| pvCallbackContext | Context that is passed back to the callback defined by the next parameter |
| callback | A BOOTSTRAP_RESOLVE_CALLBACK called back for each resolve result + the E_NO_MORE |

The CancelResolve function cancels an application requested resolution.

| Name | Description |
|---|---|
| pvContext | Used to pass the value of DRT_BOOTSTRAP_PROVIDER pvContext |

The Register function registers an endpoint with the bootstrapping mechanism that other nodes can use resolve to find.

| Name | Description |
|---|---|
| pvContext | Used to pass the value of DRT_BOOTSTRAP_PROVIDER pvContext |
| pAddressList | The list of addresses to register with the bootstrapping mechanism |

The Unregister function unregisters an endpoint with the bootstrapping mechanism. As a result, other nodes will not be able to find the local node through a resolve.

| Name | Description |
|---|---|
| pvContext | Used to pass the value of DRT_BOOTSTRAP_PROVIDER pvContext |

DRT_SETTINGS is the interface for the settings of the DRT being opened via DrtOpen.

```
typedef struct drt_settings_tag
{
    DWORD           dwSize;
    ULONG           cbKey;
    BYTE            bProtocolMajorVersion;
    BYTE            bProtocolMinorVersion;
    ULONG           ulMaxRoutingAddresses;
    HTRANSPORT hTransport;
    DRT_SECURITY_PROVIDER *pSecurityProvider;
    DRT_BOOTSTRAP_PROVIDER *pBootstrapProvider;
} DRT_SETTINGS, *PDRT_SETTINGS;
typedef const DRT_SETTINGS *PCDRT_SETTINGS;
```

| Name | Description |
|---|---|
| dwSize | The size of this structure via sizeof(DRT_SETTINGS) to allow future growth. |
| dwSecurityMode | The DRT_SECURITY_MODE the DRT should use |
| cbKey | The exact number for the key in this DRT instance. For example, 8K can be supported, other values will return E_INVALIDARG. |
| bProtocolMajor | Byte that represents the protocol major version |
| bProtocolMinor | Byte that represents the protocol minor version |
| ulMaxRoutingAddresses | The maximum number of addresses, the DRT should register when an application registers a key. Maximum value for this field can be set to 20; one embodiment uses 4 (this will fit in the UDP MTU) |
| hTransport | Handle to the transport provider to use |
| pSecurityProvider | Pointer to the security provider to use |
| pBootstrapProvider | Pointer to the bootstrap provider to use |

DRT_REGISTRATION is for a key registration found via a search issued by DrtStartSearch. This structure is contained in an overall DRT_SEARCH_RESULT.

```
typedef struct drt_registration_tag
{
    DRT_DATA key;
    DRT_DATA appData;
} DRT_REGISTRATION, *PDRT_REGISTRATION;
typedef const DRT_REGISTRATION *PCDRT_REGISTRATION;
```

| Name | Description |
|---|---|
| key | The key to be registered. |
| appData | Endpoints to be registered with the DRT - maximum limit of 8K |

DRT_SEARCH_INFO is the structure that represents the search query being issued via DrtStartSearch.

```
typedef struct drt_search_info_tag
{
    DWORD dwSize;
    BOOL fIterative;
    BOOL fAllowCurrentInstanceMatch;
    BOOL fAnyMatchInRange;
    ULONG cMaxEndpoints;
    DRT_DATA* pMaximumKey;
    DRT_DATA* pMinimumKey;
} DRT_SEARCH_INFO, *PDRT_SEARCH_INFO;
typedef const DRT_SEARCH_INFO *PCDRT_SEARCH_INFO;
```

| Name | Description |
| --- | --- |
| dwSize | Count of bytes of this structure |
| fIterative | Whether or not the search is iterative |
| fAllowCurrentInstanceMatch | Whether or not to include search results from the local DRT instance in this process |
| fAnyMatchInRange | Whether or not the search should stop after the first match found in the range specified, or continue to try to find the closest to the key specified in the DrtStartSearch API. |
| cMaxEndpoints | The number of results to return. This includes closest and exact nodes for a non-RETURN_PATH search. If this is greater than 1 for a DRT_SEARCH_RETURN_PATH search, the search will return 1 result. |
| pMaximumKey | The maximum key the infrastructure should attempt to match; by default, if this is not filled in, it is the maximum value a key can have. |
| pMinimumKey | The minimum key the infrastructure should attempt to match; by default, if this is not filled in, it is the minimum value a key can have. |

DRT_SEARCH_RESULT is a search result found by a search issued via DrtStartSearch. It contains the actual registration entry and the type of match.

```
typedef struct drt_search_result_tag
{
    DWORD dwSize;
    DRT_MATCH_TYPE type;
    PVOID pvContext;
    DRT_REGISTRATION registration;
} DRT_SEARCH_RESULT, *PDRT_SEARCH_RESULT;
typedef const DRT_SEARCH_RESULT
    *PCDRT_SEARCH_RESULT;
```

| Name | Description |
| --- | --- |
| dwSize | The size of this structure |
| hr | |
| fSearchComplete | |
| type | The DRT_MATCH_TYPE for this search result |
| pvContext | The context passed into DrtStartSearch for the search |
| Registration | The DRT_REGISTRATION for this search result |

DRT_EVENT_DATA. After an application receives an event signal, the application calls the DrtGetEventData to get the data associated with that event. This structure contains the data returned based on the event.

```
typedef struct drt_event_data_tag
{
    DRT_EVENT_TYPE type;
    HRESULT hr;
    PVOID pvContext;
    union
    {
        DRT_STATUS status;
        struct
        {
            DRT_LEAFSET_KEY_CHANGE_TYPE change;
            DRT_DATA localKey;
            DRT_DATA remoteKey;
        } leafsetKeyChange;
    };
} DRT_EVENT_DATA, *PDRT_EVENT_DATA;
typedef const DRT_EVENT_DATA *PCDRT_EVENT_DATA;
```

| Name | Description |
| --- | --- |
| type | The event type - corresponds to the DRT_EVENT_TYPE enum. |
| hr | The HRESULT of the operation for which the event was signaled. This is how an application determines if a search result is the last result. |
| pvContext | Pointer to the context passed in to the API that generated the event. |

Based on the DRT_EVENT_TYPE, the union will contain a field/structure specific to that event type. If the DRT_EVENT_TYPE is a status change, it will contain the following:

| Name | Description |
| --- | --- |
| status | The updated DRT_STATUS of the DRT. |

A leaf set key is a key that is contained in the cache of a DRT locally. By paying attention to these events, an application can know the contents of the local DRT cache for use. If the DRT_EVENT_TYPE is a leaf set key change, the union contains the following:

| Name | Description |
| --- | --- |
| change | The type of key change that occurred |
| localKey | The local key (representing the cache) in which the remote key changed |
| remoteKey | The remote key that changed |

The following functions can be included in the DRT API. A DrtCreatePnrpBootstrapResolver function creates a generic bootstrap resolver based on the PNRP protocol. The returned pointer is passed to DrtOpen via the DRT_SETTINGS structure.

```
HRESULT WINAPI DrtCreatePnrpBootstrapResolver(
    __in       BOOL fPublish,
    __in       PCWSTR pwzPeerName,
    __in_opt   PCWSTR pwzCloudName,
    __in_opt   PCWSTR pwzPublishingIdentity,
    __out      DRT_BOOTSTRAP_PROVIDER** ppResolver);
```

Parameters:

| Name | Description |
| --- | --- |
| pwzDrtName | The name of the DRT being looked for in PNRP - it can be 137 Unicode characters, for example. |
| pwzCloudName | The name of the cloud to look in for the DRT corresponding to the MeshName. |
| pwzPublishingIdentity | The PeerIdentity that is publishing into the PNRP cloud used for bootstrapping. |
| ppResolver | A pointer to the created PNRP bootstrap resolver - used in the DRT_SETTINGS structure. |

A DrtDeletePnrpBootstrapResolver function deletes a generic bootstrap resolver based on the PNRP protocol.

```
void WINAPI DrtDeletePnrpBootstrapResolver(
    __in    DRT_BOOTSTRAP_PROVIDER* pResolver);
```

Parameters:

| Name | Description |
| --- | --- |
| ppResolver | A pointer to the created PNRP bootstrap resolver - used in the DRT_SETTINGS structure. |

A DrtCreateIpv6UdpTransport function creates a generic transport based on the IPv6 UDP protocol. The returned pointer is passed to DrtOpen via the DRT_SETTINGS structure.

```
HRESULT WINAPI DrtCreateIpv6UdpTransport(
                DRT_SCOPE scope,
                ULONG scopeId,
    __inout     SHORT *pwPort,
    __out       HTRANSPORT *phTransport);
```

Parameters:

| Name | Description |
| --- | --- |
| scope | The overall IPv6 scope in which the DRT will be operating in |
| scopeId | The identifier that uniquely specifies what interface the scope is associated with. For the Global scope, this is always the global ID and is optional if only using the global scope. For the link local scope, this represents the interface associated with the NIC on which the link local scope exists. |
| pwPort | The port the local DRT instance will be using |
| phTransport | Pointer to a DRT transport handle - used in DRT_SETTINGS structure |

HRESULT Values: DRT_E_INVALID_PORT—one of the fields is invalid—for example, the port is in use and the DRT cannot use that port.

A DrtDeleteIpv6UdpTransport function deletes a generic transport based on the IPv6 UDP protocol.

```
HRESULT WINAPI DrtDeleteIpv6UdpTransport(
    __in HTRANSPORT hTransport);
```

Parameters:

| Name | Description |
| --- | --- |
| phTransport | Pointer to a DRT transport handle - used in DRT_SETTINGS structure |

A DrtCreateDerivedKeySecurityProvider function creates a Derived Key Security Provider based on the IPv6 UDP protocol. The returned pointer is passed to DrtOpen via the DRT_SETTINGS structure.

```
HRESULT WINAPI DrtCreateDerivedKeySecurityProvider(
    __in    PCCERT_CONTEXT pRootCert,
    __out   DRT_SECURITY_PROVIDER**
            ppSecurityProvider);
```

Parameters:

| Name | Description |
| --- | --- |
| pRootCert | Pointer to the certificate that is the "root" part of the chain. This is used to verify that remotely published keys are derived from certificate chains with the same root. |
| ppSecurityProvider | Pointer to the created security provider |

A DrtCreateDerivedKey function creates a key that can be registered with the DRT. The key will be generated from the passed in credential, and must have the same root chain as what was passed in to DrtCreateDerivedKeySecurityProvider.

```
HRESULT WINAPI DrtCreateDerivedKey(
    __in    PCCERT_CONTEXT pLocalCert,
    __out   DRT_DATA* pKey);
```

Parameters:

| Name | Description |
| --- | --- |
| pLocalCert | Pointer to the certificate that is the "local" part of the chain. This certificate is used to generate a key that can be used to register a key with the DRT |
| pKey | Pointer to the key created |

A DrtDeleteDerivedKeySecurityProvider function deletes a derived key security provider.

```
VOID WINAPI DrtDeleteDerivedKeySecurityProvider(
    __in    DRT_SECURITY_PROVIDER*
            pSecurityProvider);
```

Parameters:

| Name | Description |
| --- | --- |
| ppSecurityProvider | Pointer to the created security provider |

A DrtOpen function opens (or creates) a new local DRT instance specified by the DRT_SETTINGS structure passed in.

```
HRESULT WINAPI DrtOpen(
    __in         const DRT_SETTINGS* pSettings,
    __in_opt     HANDLE hEvent;
    __in_opt     const PVOID pvContext,
    __out        HDRT *phDrt);
```

Parameters:

| Name | Description |
|---|---|
| pSettings | The settings to use for this DRT instance |
| hEvent | Handle to the event to signal when an event occurs |
| pvContext | User defined context, which can be passed straight through to the app via the events |
| phDrt | The new handle associated with this DRT, for use in all future operations on this DRT instance. |

A DrtClose function closes and cleans up the local instance of the DRT.

```
HRESULT WINAPI DrtClose(
    __in HDRT hDrt);
```

Parameters:

| Name | Description |
|---|---|
| hDrt | Handle to the DRT to close - returned from DrtOpen |

A DrtRegisterKey function registers a given key in the DRT. If the API is called with a key that has already been registered, it updates the key.

```
HRESULT WINAPI DrtRegisterKey(
    __in         HDRT hDrt,
    __in         DRT_REGISTRATION *pRegistration,
    __in_opt     PVOID pvKeyContext,
    __out        HKEYREGISTRATION *phKeyRegistration);
```

Parameters:

| Name | Description |
|---|---|
| hDrt | DRT handle returned from DrtOpen |
| pRegistration | Handle to a DRT_REGISTRATION |
| pvKeyContext | Pointer to a context to associate with the key in the DRT. This key context is passed to the security provider key functions. Interpretation of this value is defined by the security provider being used. |
| phKeyRegistration | Pointer to a handle for a key that has been registered |

A DrtUnregisterKey function unregisters a given key from the DRT.

```
HRESULT WINAPI DrtUnregisterKey(
    __in HKEYREGISTRATION hKeyRegistration);
```

Parameters:

| Name | Description |
|---|---|
| hKeyRegistration | handle to the key to unregister |

A DrtStartSearch function starts a search for a given key through the DRT using the criteria specified in the DRT_SEARCH_INFO. The handle specified is signaled when a search result is found. The application then calls DrtGetSearchResult to get the search result.

```
HRESULT WINAPI DrtStartSearch(
    __in         HDRT hDrt,
    __in         DRT_DATA *pKey,
    __in_opt     const DRT_SEARCH_INFO *pInfo,
                 ULONG timeout,
    __in         HANDLE hEvent,
    __in_opt     const PVOID pvContext,
    __out        HDRT_SEARCH_CONTEXT* hSearchContext);
```

Parameters:

| Name | Description |
|---|---|
| hDrt | Handle to the DRT instance |
| pKey | The key to search for (e.g., the Target Key) |
| pInfo | Structure used to alter the behavior of the search. |
| dwTimeout | Time (e.g., milliseconds) until operation is terminated and DRT_E_TIMEOUT is returned to pCallback function. |
| hEvent | Handle to the event that should be signaled when this API finishes or when a result is received during an iterative search. |
| pvContext | Context pointer to pass to the app through the event. |
| hSearchContext | Handle used in the call to DrtEndSearch |

A DrtContinueSearch function continues a DRT_SEARCH_RETURN_PATH search for a particular key in a DRT. This API can be called anytime after a search has been issued. It will cause the search to continue, and results will continue being returned via the DRT_SEARCH_RESULT event.

```
HRESULT WINAPI DrtContinueSearch(
    __in HDRT_SEARCH_CONTEXT hSearchContext);
```

Parameters:

| Name | Description |
|---|---|
| hSearchContext | Handle to the search context to close - returned from DrtStartSearch |

After the search event is signaled, this DrtGetSearchResult API allows the caller to retrieve the search result. While the queue has search results, the API will return S_OK. The application should continue to loop using this API, while receiving S_OK. When the queue is empty, the API will return DRT_E_SEARCH_IN_PROGRESS or DRT_E_NO_MORE. If DRT_E_SEARCH_IN_PROGRESS is returned, the search is not complete, and the application should continue to wait on the event handle. If DRT_E_NO_MORE is returned, the search is complete, and the application should no longer continue to wait on the event handle.

```
HRESULT WINAPI DrtGetSearchResult(
    __in     HDRT_SEARCH_CONTEXT hSearchContext,
    __out    DRT_SEARCH_RESULT **ppSearchResult);
```

Parameters:

| Name | Description |
|---|---|
| hSearchContext | Handle to the search context to close - returned from DrtStartSearch |
| ppSearchResult | Pointer to a pointer with the search result |

A DrtEndSearch function ends a search for a particular key in a DRT. This API can be called anytime after a search has been issued. It will cause the search to be cancelled, and results will stop being returned via the DRT_SEARCH_RESULT event. This API is called after the application receives the DRT_E_NO_MORE hresult from the search event.

```
HRESULT WINAPI DrtEndSearch(
    __in HDRT_SEARCH_CONTEXT hSearchContext);
```

Parameters:

| Name | Description |
|---|---|
| hSearchContext | Handle to the search context to close - returned from DrtStartSearch |

A DrtGetEventData function gets the event data associated with an event when the event is signaled.

```
HRESULT WINAPI DrtGetEventData(
    __in     HDRT hDrt,
    __out    DRT_EVENT_DATA **ppEventData);
```

Parameters:

| Name | Description |
|---|---|
| hDrt | Handle to the DRT for which the event occurred |
| ppEventData | Pointer to a pointer containing the event data |

A DrtFreeData function frees data returned to the caller via a DRT API such as DrtGetEventData. An application only has to call DrtFreeData once with the pointer given back by the GetEventData. The application does not have to call it for each contained pointer in the structure that is returned.

```
VOID WINAPI DrtFreeData(PVOID pvData);
    __in PVOID pvData):
```

Parameters:

| Name | Description |
|---|---|
| pvData | Pointer to the data structure allocated by the DRT API |

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 11:
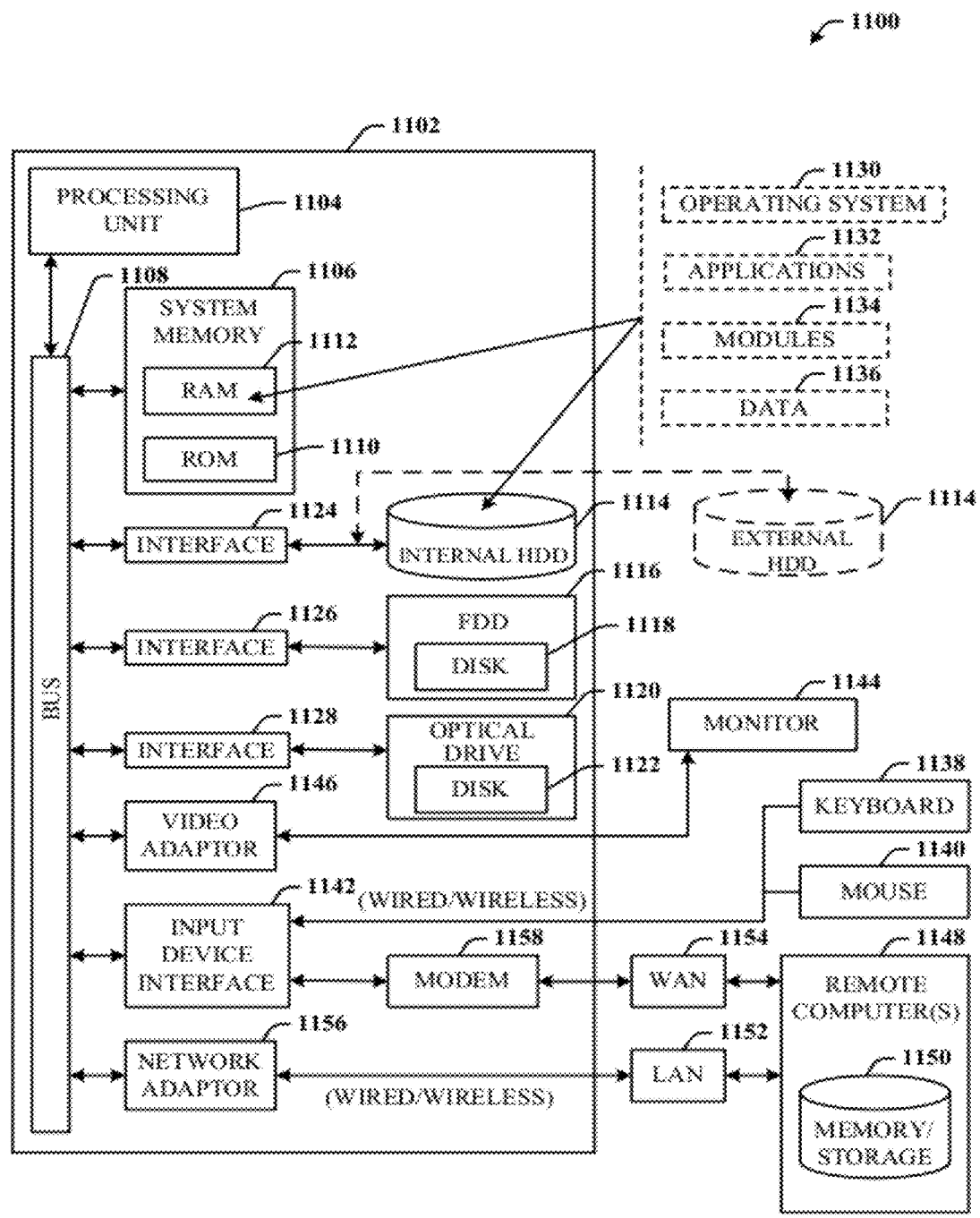
FIG. 11 illustrates a block diagram of a computing system operable to execute the disclosed DRT architecture.

Referring now to FIG. 11, there is illustrated a block diagram of a computing system 1100 operable to execute the disclosed DRT architecture. In order to provide additional context for various aspects thereof, FIG. 11 and the following discussion are intended to provide a brief, general description of a suitable computing system 1100 in which the various aspects can be implemented. While the description above is in the general context of computer-executable instructions that may run on one or more computers, those skilled in the art will recognize that the novel architecture also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary computing system 1100 for implementing various aspects includes a computer 1102, the computer 1102 including a processing unit 1104, a system memory 1106 and a system bus 1108. The system bus 1108 provides an interface for system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed architecture.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the disclosed architecture can be implemented with various commercially available operating systems or combinations of operating systems. The modules 1134 and/or programs 1136 can include the API and DRT functionality for serverless collaboration.

A user can enter commands and information into the computer 1102 through one or more wired/wireless input devices, for example, a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 12:
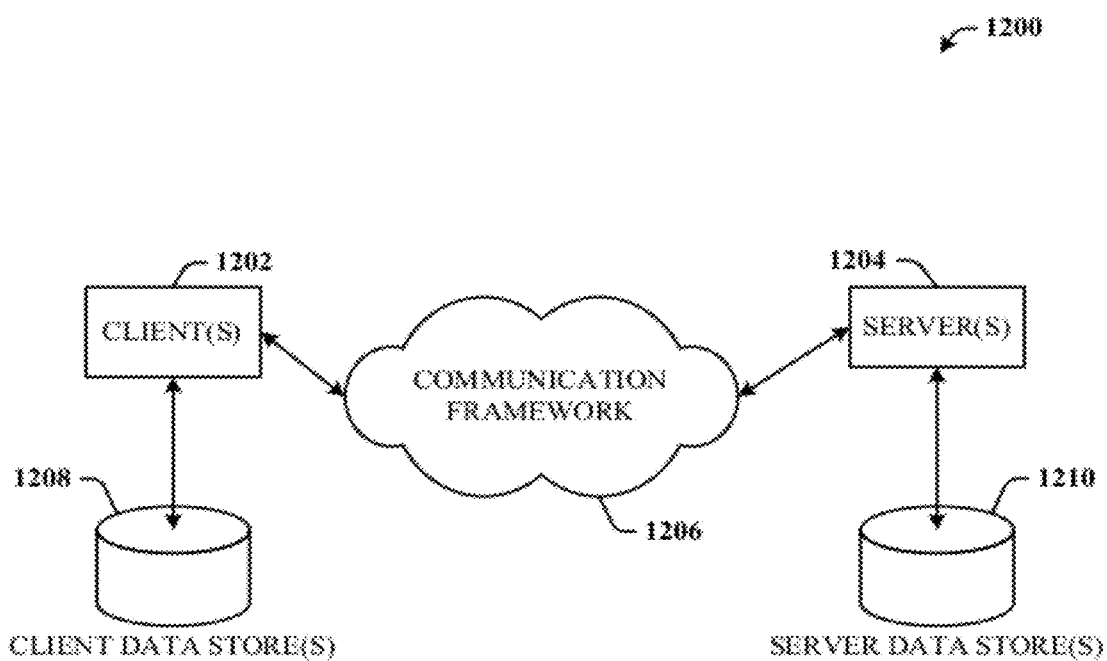
FIG. 12 illustrates a schematic block diagram of an exemplary computing environment that facilitates mesh node access via the disclosed DRT API.

Referring now to FIG. 12, there is illustrated a schematic block diagram of an exemplary computing environment 1200 that facilitates mesh node access via the disclosed DRT API. The system 1200 includes one or more client(s) 1202. The client(s) 1202 can be hardware and/or software (e.g., threads, processes, computing devices). The client(s) 1202 can house cookie(s) and/or associated contextual information, for example.

The system 1200 also includes one or more server(s) 1204. The server(s) 1204 can also be hardware and/or software (e.g., threads, processes, computing devices). The servers 1204 can house threads to perform transformations by employing the architecture, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

Although illustrated as a client/server environment, the clients 1202 can be associated with the devices illustrated in FIG. 5, including but not limited to the desktop computers, laptop computer(s), portable terminal device and servers. In other words, collaboration can be obtained with server systems (e.g., servers 1204) independent of a need for a service in order for the collaboration over the mesh.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method of managing communications, comprising:
    launching an application of a first device for collaboration with a group of devices;
    opening a local node instance of a distributed routing table in the first device based on a call from the application;
    transitioning state of the local node instance from a bootstrapping state, for bootstrapping the local node instance into the distributed routing table, into an active state for participating in the distributed routing table, based on a condition related to the group of devices;
    detaching the first device from the group of devices by closing the local node instance; and
    utilizing a processor that executes instructions stored in memory to perform at the acts of launching, opening, transitioning, and detaching.

2. The method of claim 1, further comprising unregistering all keys based on a call from the application.

3. The method of claim 1, further comprising generating a search query by the application and limiting the search to remote nodes.

4. The method of claim 1, further comprising generating a search query by the application and defining a search to return an exact match or a closest result.

5. The method of claim 1, further comprising returning a key/endpoint pair to the application for each node accessed during a search operation.

6. The method of claim 1, further comprising specifying an IPv6 scope in which the distributed routing table operates.

7. The method of claim 1, further comprising specifying a security mode in which the distributed routing table operates.

8. The method of claim 1, further comprising specifying a change to a leaf set node in the local node instance.

9. The method of claim 1, further comprising opening a second local node instance for a second application and for communication with a second group of devices.

10. A computer-implemented system, comprising:
    an application of a first device configured to launch for collaboration with a group of devices;
    a local node instance of a distributed routing table configured to open in the first device based on a call from the application;
    state of the local node instance that transitions from a bootstrapping state, for bootstrapping the local node instance into the distributed routing table, into an active state for participating in the distributed routing table, based on a condition related to the group of devices;
    a search component configured to search the group of devices for a destination device; and
    a processor that executes computer-executable instructions stored in a memory associated application, the local node instance, the state, and the searching component.

11. The system of claim 10, wherein a bootstrap process is initiated based on the call from the application.

12. The system of claim 10, wherein, if zero connections are obtained to other devices or node instances thereof, transition is to an alone state.

13. The system of claim 10, wherein, if at least one device connection is made, transition is to an active state.

14. The system of claim 10, if loss of connectivity occurs, transition is to a no-network state.

15. A method of searching for a key in accordance with an implementation, comprising acts of:
    launching an application of a device and opening a local instance of a distributed routing table based on an application call;
    creating a search query, using the application, that includes search information for defining as a search space at least one of a local node or remote nodes;
    initiating a search of the distributed routing table based on the search query, to produce search results;
    receiving and processing the search results, using the application, by updating a local routing table; and
    utilizing a processor that executes instructions stored in memory to perform at least one of the acts of launching, creating, initiating or receiving.

16. The method of claim 15, wherein the initiating comprises initiating an exact search that returns an exact key match.

17. The method of claim 15, wherein the initiating comprises initiating a closest search.

18. The method of claim 15, wherein the search information defines whether the search also returns a search path for each search result.

19. The method of claim 15, wherein the search information defines the number of results to return.

20. The method of claim 15, wherein, for an infrastructure communication with a node during the search, the application obtains the key/endpoint pair of that node.

* * * * *